(12) United States Patent
Jiang

(10) Patent No.: US 11,445,461 B2
(45) Date of Patent: Sep. 13, 2022

(54) METHOD AND DEVICE FOR SETTING TIME ADVANCE GROUP IDENTIFIER, METHOD AND DEVICE FOR CONFIGURING TIME ADVANCE GROUP IDENTIFIER, AND USER EQUIPMENT

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 221 days.

(21) Appl. No.: 16/858,648

(22) Filed: Apr. 26, 2020

(65) Prior Publication Data
US 2020/0260398 A1 Aug. 13, 2020

Related U.S. Application Data

(63) Continuation of application No. PCT/CN2017/108948, filed on Nov. 1, 2017.

(51) Int. Cl.
*H04W 76/27* (2018.01)
*H04W 74/08* (2009.01)
*H04W 56/00* (2009.01)
*H04L 1/18* (2006.01)
*H04W 72/04* (2009.01)
*H04W 72/12* (2009.01)
*H04W 80/02* (2009.01)

(52) U.S. Cl.
CPC ....... *H04W 56/0045* (2013.01); *H04L 1/1819* (2013.01); *H04W 72/0413* (2013.01); *H04W 72/1257* (2013.01); *H04W 74/0833* (2013.01); *H04W 76/27* (2018.02); *H04W 80/02* (2013.01)

(58) Field of Classification Search
None
See application file for complete search history.

(56) References Cited

U.S. PATENT DOCUMENTS 8,848,674 B2 9/2014 Kwon
9,655,071 B2 5/2017 Kwon et al.
10,813,137 B2 * 10/2020 Shih .................... H04W 74/004
(Continued)

FOREIGN PATENT DOCUMENTS

CN 103518407 A 1/2014
CN 103597765 A 2/2014
(Continued)

OTHER PUBLICATIONS

First Office Action of the Chinese application No. 201780001829.5, dated Nov. 4, 2020.
(Continued)

*Primary Examiner* — Edan Orgad
*Assistant Examiner* — Emmanuel K Maglo
(74) *Attorney, Agent, or Firm* — Syncoda LLC; Feng Ma

(57) ABSTRACT

A method for setting a time advance group (TAG) identifier includes: receiving configuration information sent by a base station, the configuration information comprising a supplement uplink (SUL) carrier configured for a serving cell of user equipment (UE); and setting, according to the configuration information, TAG identifiers (IDs) for the SUL carrier and a non-SUL carrier of the serving cell of the UE.

18 Claims, 19 Drawing Sheets

(56) References Cited

U.S. PATENT DOCUMENTS

| | | | |
|---|---|---|---|
| 2012/0300752 A1 | 11/2012 | Kwon | |
| 2013/0028204 A1* | 1/2013 | Dinan | H04L 5/0098 370/329 |
| 2015/0009985 A1 | 1/2015 | Kwon et al. | |
| 2015/0071261 A1* | 3/2015 | Lee | H04W 74/0833 370/336 |
| 2015/0334669 A1 | 11/2015 | Zhang et al. | |
| 2017/0245232 A1 | 8/2017 | Kwon et al. | |
| 2018/0376510 A1* | 12/2018 | Sun | H04W 74/006 |
| 2020/0169990 A1* | 5/2020 | Takeda | H04W 52/367 |
| 2020/0305186 A1* | 9/2020 | Alfarhan | H04W 80/02 |

FOREIGN PATENT DOCUMENTS

| | | |
|---|---|---|
| CN | 104904174 A | 9/2015 |
| CN | 105379339 A | 3/2016 |
| CN | 105578584 A | 5/2016 |
| CN | 106304312 A | 1/2017 |
| WO | 2013165093 A1 | 11/2013 |

OTHER PUBLICATIONS

NEC. Views on UL Sharing of NR and LTE. 3GPP TSG-RAN WG1 Meeting NR#3 R1-1716232, Sep. 21, 2017 (Sep. 21, 2017), entire document.

International Search Report in the international application No. PCT/CN2017/108948, dated Jul. 6, 2018.

English translation of the Written Opinion of the International Search Authority in the international application No. PCT/CN2017/108948, dated Jul. 6, 2018.

3GPP TSG RAN meeting #76 RP-1711505, West Palm Beach, USA, Jun. 5-8, 2017, "Status Report to TSG", Agenda item: 9.2.1.

* cited by examiner

METHOD AND DEVICE FOR SETTING TIME ADVANCE GROUP IDENTIFIER, METHOD AND DEVICE FOR CONFIGURING TIME ADVANCE GROUP IDENTIFIER, AND USER EQUIPMENT

CROSS-REFERENCE TO RELATED APPLICATION

The present application is a continuation of International Application No. PCT/CN2017/108948 filed on Nov. 1, 2017, the disclosure of which is hereby incorporated by reference in its entirety.

BACKGROUND

In 4th Generation (4G) mobile communication technology, each serving cell of UE may be configured to belong to a TAG. A base station may control a time advance of each TAG through a Timing Advance Command (TAC) to maintain Uplink (UL) synchronization. Each TAG may be associated with a time alignment timer. After the time alignment timer expires, it may be considered that UL synchronization is not implemented for each serving cell in the TAG and operations of releasing a Hybrid Automatic Repeat reQuest (HARQ) cache, releasing a Physical Uplink Control Channel (PUCCH) or Semi-Persistent Scheduling (SPS) and releasing Downlink (DL) assignment and UL grant are executed. For a primary TAG (pTAG) and a secondary TAG (sTAG), operations after expiration of time alignment timers may be somewhat different. For the pTAG, related releasing operations are required to be executed for all serving cells after the time alignment timer expires. For the sTAG, related releasing operations are required to be executed only for serving cells belonging to the sTAG after the time alignment timer expires.

SUMMARY

The present disclosure generally relates to the technical field of communication, and more specifically to a method and device for setting Time Advance Group (TAG) Identifier (ID) and a method and device for configuring TAG ID, User Equipment (UE), a base station and a computer-readable storage medium.

Various embodiments of the present application provide TAG ID setting and configuration methods and devices, UE, a base station and a computer-readable storage medium, to set a SUL carrier and non-SUL carrier of a serving cell in corresponding TAGs.

According to a first aspect of embodiments of the present disclosure, a TAG ID setting method is provided, which can be applied to UE and include the following operations:

configuration information sent by a base station is received, the configuration information including a SUL carrier configured for a serving cell of the UE; and TAG IDs are set for the SUL carrier and a non-SUL carrier of the serving cell of the UE according to the configuration information respectively.

According to a second aspect of the embodiments of the present disclosure, UE is provided, which may include:

a processor; and a memory configured to store an instruction executable for the processor, wherein the processor can be configured to:

receive configuration information sent by a base station, the configuration information including a SUL carrier configured for a serving cell of the UE; and set TAG IDs for the SUL carrier and a non-SUL carriers of the serving cell of the UE according to the configuration information respectively.

According to a third aspect of the embodiments of the present disclosure, a computer-readable storage medium is provided, in which a computer instruction can be stored, the instruction being executed by a processor to implement the operations of the TAG ID setting method.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
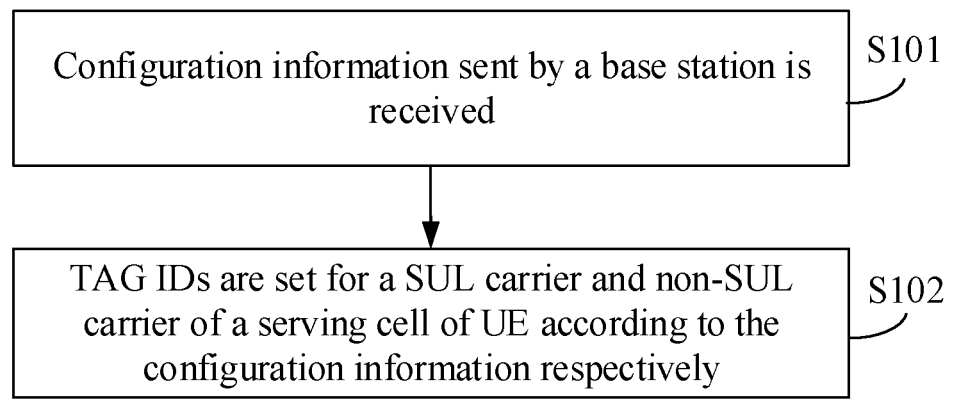
FIG. 1 is a flowchart showing a TAG ID setting method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

In 5th Generation (5G) mobile communication technology, Supplement UpLink (SUL) carrier is introduced. A SUL carrier corresponds to no DL carrier. Usually, a SUL carrier may be a low-band carrier, and a New Radio (NR) carrier is a high-band carrier. A SUL carrier is configured for UL coverage enhancement, and it is determined by discussions that a SUL carrier may not become an independent cell and, instead, is paired with a DL carrier and belongs to a cell corresponding to the DL carrier. After a cell is configured with a SUL carrier, the cell may correspond to two UL carriers, one being the SUL carrier and the other being a non-SUL carrier.

Since a cell corresponds to two UL carriers, a TAG in 4G may not be adapted to SUL. This is because they have different frequency characteristics and may require different time advances, namely they may be required to be configured in different TAGs. However, in 4G only one TAG can be configured for a cell.

FIG. 1 is a flowchart showing a TAG ID setting method according to some embodiments of the present disclosure. These embodiments can be described from a UE side. As shown in FIG. 1, the TAG ID setting method includes the following operations.

In S101, configuration information sent by a base station is received, the configuration information includes a SUL carrier configured for a serving cell of UE.

In S102, TAG IDs are set for the SUL carrier and a non-SUL carrier of the serving cell of the UE according to the configuration information respectively.

The operation that the TAG IDs are set for the SUL carrier and non-SUL carrier of the serving cell of the UE according to the configuration information respectively can be implemented through the following two manners.

A first manner: in response to that the configuration information further includes the TAG IDs configured for the SUL carrier and non-SUL carrier of the serving cell of the UE respectively, the corresponding TAG IDs can be directly set for the SUL and non-SUL carriers of the serving cell of the UE according to the configuration information.

The SUL carrier and the non-SUL carrier can be in the same TAG, namely the same TAG ID is set for them. They may also be in different TAGs, namely different TAG IDs are set for them.

A second manner: after the configuration information is received, the TAG IDs can be set for the SUL carrier and the non-SUL carrier of the serving cell of the UE in a system stipulated manner respectively.

For example, the TAG ID of the non-SUL carrier of the serving cell of the UE can be set to be 0, and the TAG ID of the SUL carrier of the serving cell of the UE can be set to be 1.

The configuration information can be contained in an RRC message.

A difference between the above two manners is that: in the first manner, the configuration information sent to the UE is required to include the TAG IDs configured for the SUL carrier and non-SUL carrier of the serving cell of the UE respectively, however, in the second manner, while the configuration information is not required to include the TAG IDs. For the second manner, the UE, after learning that the serving cell of the UE is configured with the SUL carrier, the TAG IDs are set for the SUL carrier and non-SUL carrier of the serving cell in a system stipulated manner.

In addition, after the TAG IDs are set for the SUL carrier and non-SUL carrier of the serving cell respectively, in response to that a time alignment timer associated with a TAG corresponding to a serving cell does not run, a MAC entity may not initiate any UL transmission other than random access pilot transmission in the serving cell or on a SUL carrier and non-SUL carrier, associated with the TAG, of the serving cell, to avoid invalid UL transmission.

According to these embodiments, the configuration information is received, and the TAG IDs are set for the SUL carrier and non-SUL carrier of the serving cell of the UE according to the configuration information respectively, so that the SUL carrier and non-SUL carrier of the serving cell are set in corresponding TAGs.

Figure 2A:
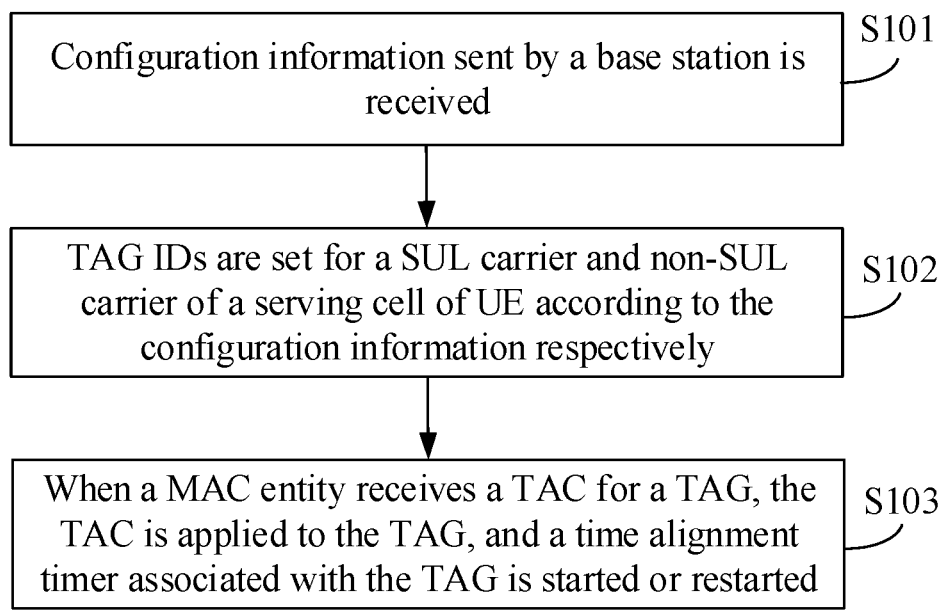
FIG. 2A is a flowchart showing another TAG ID setting method according to some embodiments of the present disclosure.

FIG. 2A is a flowchart showing another TAG ID setting method, according to some embodiments of the present disclosure. As shown in FIG. 2A, after S102, the TAG ID setting method can further include the following operation.

In S103, in response to that a MAC entity receives a TAC for a TAG, the TAC is applied to the TAG, and a time alignment timer associated with the TAG is started or restarted.

In these embodiments, in response to that the MAC entity of the UE receives a TAG MAC Control Element (CE) for a certain TAG, the TAG is applied to the TAG, and a time alignment timer associated with the TAG is started or restarted.

According to these embodiments, in response to that the MAC entity receives a TAC for a TAG, the TAC is applied to the TAG, and the time alignment timer associated with the TAG is started or restarted, so that a condition is provided for subsequently determining a state of the UE.

Figure 2B:
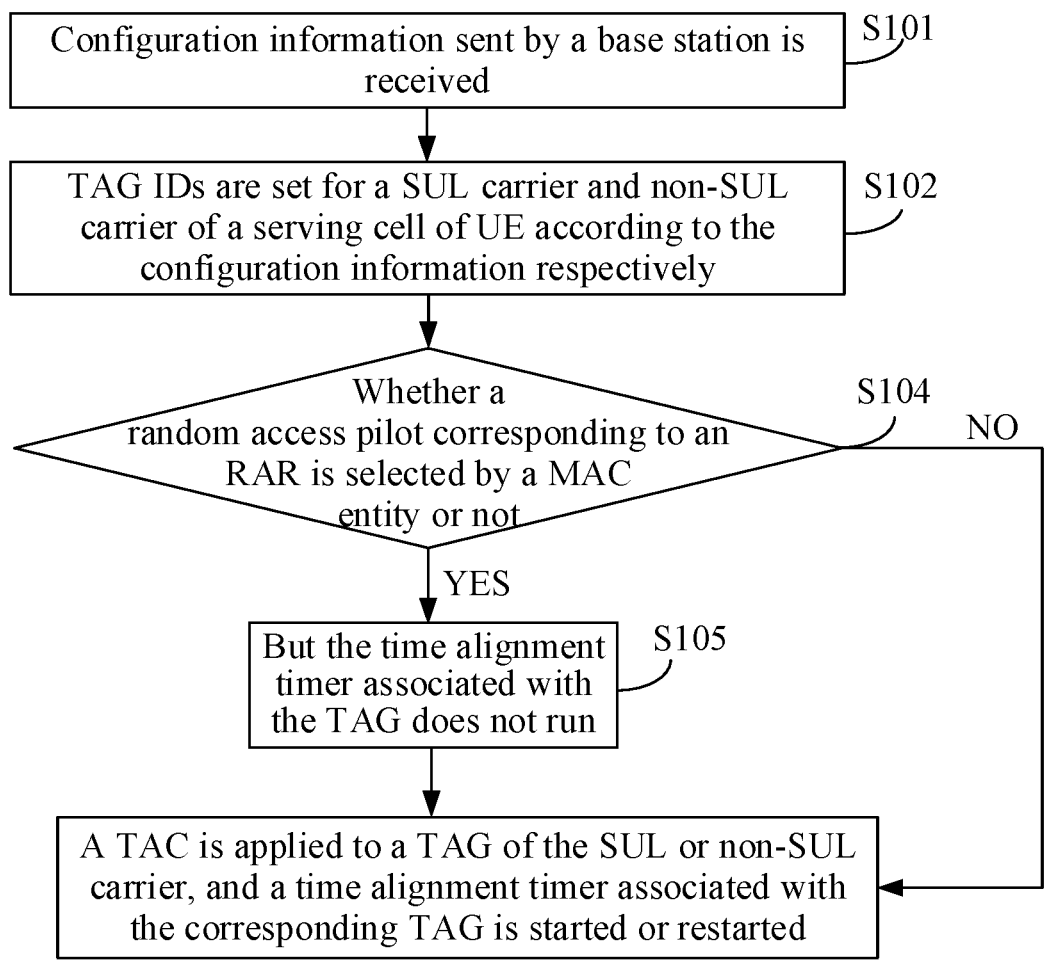
FIG. 2B is a flowchart showing yet another TAG ID setting method according to some embodiments of the present disclosure.

FIG. 2B is a flowchart showing yet another TAG ID setting method, according to some embodiments of the present disclosure. As shown in FIG. 2B, after S102, the TAG ID setting method can further include the following operations.

In S104, in response to that the MAC entity receives a TAC for a TAG of the SUL or non-SUL carrier from an RAR of a serving cell, it is determined whether a random access pilot corresponding to the RAR is selected by the MAC entity, if the random access pilot corresponding to the RAR is not selected by the MAC entity, S105 is executed, and if the random access pilot corresponding to the RAR is selected by the MAC entity but the time alignment timer associated with the TAG does not run, S105 is executed.

In S105, the TAC is applied to the TAG of the SUL or non-SUL carrier, and the time alignment timer associated with the corresponding TAG is started or restarted.

In these embodiments, in response to that the MAC entity of the UE receives a TAC in an RAR of a serving cell in a certain TAG, if a random access pilot is not selected by the MAC entity, the TAC is applied to the TAG, and a time alignment timer associated with the TAG is started or restarted. If the random access pilot corresponding to the RAR is selected by the MAC entity but the time alignment timer associated with the TAG does not run, the TAC is applied to the TAG, and the time alignment timer associated with the TAG is started or restarted. Under another condition, the received TAC is ignored.

According to these embodiments, in response to that the MAC entity receives the TAC for a TAG of the SUL or non-SUL carrier from the RAR of the serving cell, for a case that the random access pilot corresponding to the RAR is not selected by the MAC entity and for a case that the random access pilot corresponding to the RAR is selected by the MAC entity but the time alignment timer associated with the TAG does not run, the TAC is applied to the TAG of the SUL or non-SUL carrier, and the time alignment timer associated with the corresponding TAG is started or restarted, so that a condition is provided for subsequently determining the state of the UE.

Figure 3A:
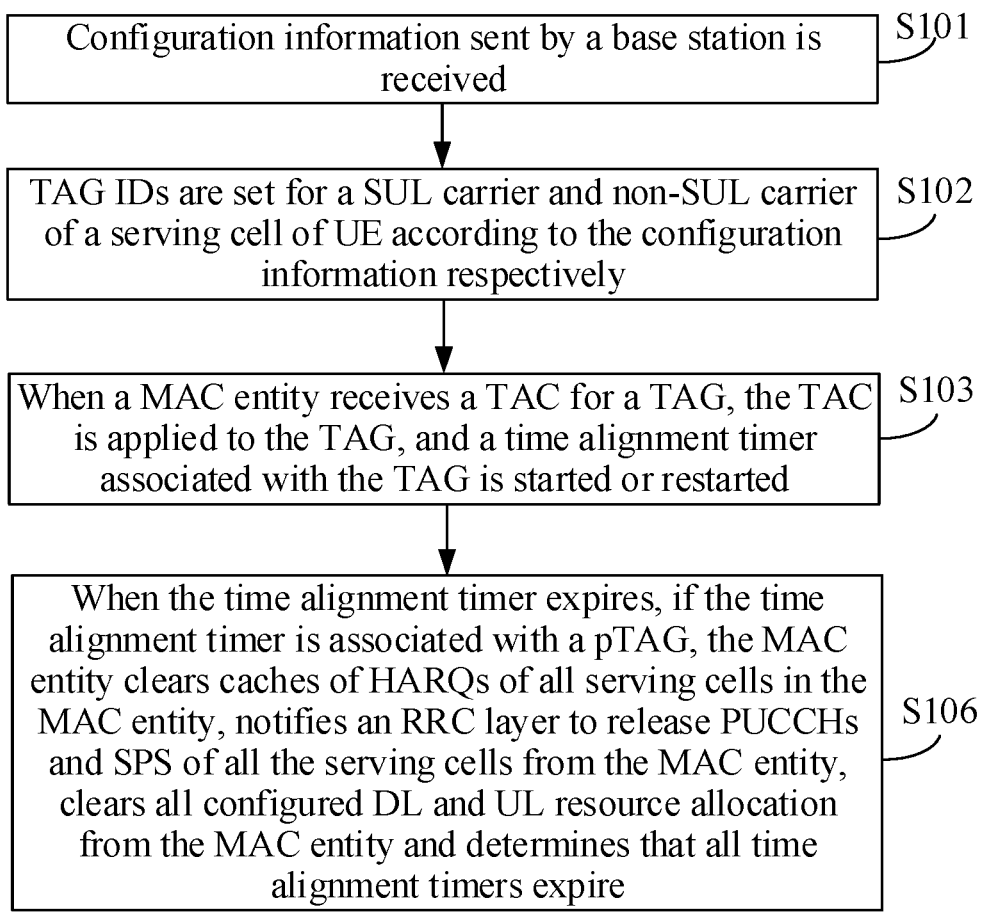
FIG. 3A is a flowchart showing still another TAG ID setting method according to some embodiments of the present disclosure.

FIG. 3A is a flowchart showing another TAG ID setting method, according to some embodiments of the present disclosure. As shown in FIG. 3A, after S103, the TAG ID setting method can further include the following operation.

In S106, in response to that the time alignment timer expires, if the time alignment timer is associated with a pTAG, the MAC entity clears caches of HARQs for all serving cells from the MAC entity, notifies an RRC layer to release PUCCHs and SPS for all the serving cells from the MAC entity, clears all configured DL and UL resource allocation for the MAC entity and determines that all time alignment timers expire.

The pTAG can be a TAG including a SUL or non-SUL carrier of an SpCell, can be a TAG where a UL carrier supporting transmission of a PUCCH of an SpCell or a UL carrier supporting transmission of a PUCCH of an SpCell and supporting contention-based random access is located, may also be a TAG where a UL carrier supporting transmission of a PUCCH of an SpCell or a UL carrier supporting transmission of a PUCCH of an SpCell and supporting contention-based random access is located and a TAG where a UL carrier supporting transmission of a PUSCH of an SpCell is located, and may also be a TAG where a UL carrier supporting transmission of a PUCCH of an SpCell or a TAG where a UL carrier supporting transmission of a PUCCH of an SpCell and supporting contention-based random access is located or a TAG where a UL carrier supporting transmission of a PUSCH of an SpCell is located. The UL carrier may include a SUL or non-SUL carrier. Another TAG other than the pTAG is an sTAG.

It is to be noted that S106 may also be executed after S105, which, however, is not presented in the figure.

In addition, in response to that the time alignment timer associated with the pTAG does not run, the MAC entity may initiate random access pilot transmission in the SpCell and may not initiate any UL transmission in another serving cell, to avoid invalid UL transmission. This is because a synchronization of a primary serving cell is unsuccessful, that is to say, a channel connected with the base station is abnormal. And before a control-plane communication channel is recovered, it is necessary to suspend a service of the other serving cell. Similarly, in response to that a time alignment timer associated with a TAG corresponding to a serving cell does not run, the MAC entity may not initiate any UL transmission other than random access pilot transmission in the serving cell or on a SUL carrier and non-SUL carrier, associated with the TAG, of the serving cell, to avoid invalid UL transmission.

Moreover, in another serving cell (SCell) other than the SpCell or on a UL carrier of the SCell or on a UL carrier, belonging to an sTAG, of the SpCell, in response to that UL transmission exceeds a maximum UL transmission time difference or exceeds a maximum UL transmission time difference between two TAGs that can be processed by the UE, the MAC entity stops the UL transmission and determines that a time alignment timer associated with the SCell or the UL carrier of the SCell or the UL carrier, belonging to the sTAG, of the SpCell expires. The SpCell may include a primary cell or a Primary Secondary Cell (PSCell).

According to these embodiments, after a time alignment timer associated with a pTAG expires, the caches of HARQs of all the serving cells from the MAC entity are cleared, the RRC layer is notified to release the PUCCHs of SPS of all the serving cells from the MAC entity, and all configured DL and UL resource allocation from the MAC entity is cleared, to achieve the purpose of releasing resources.

Figure 3B:
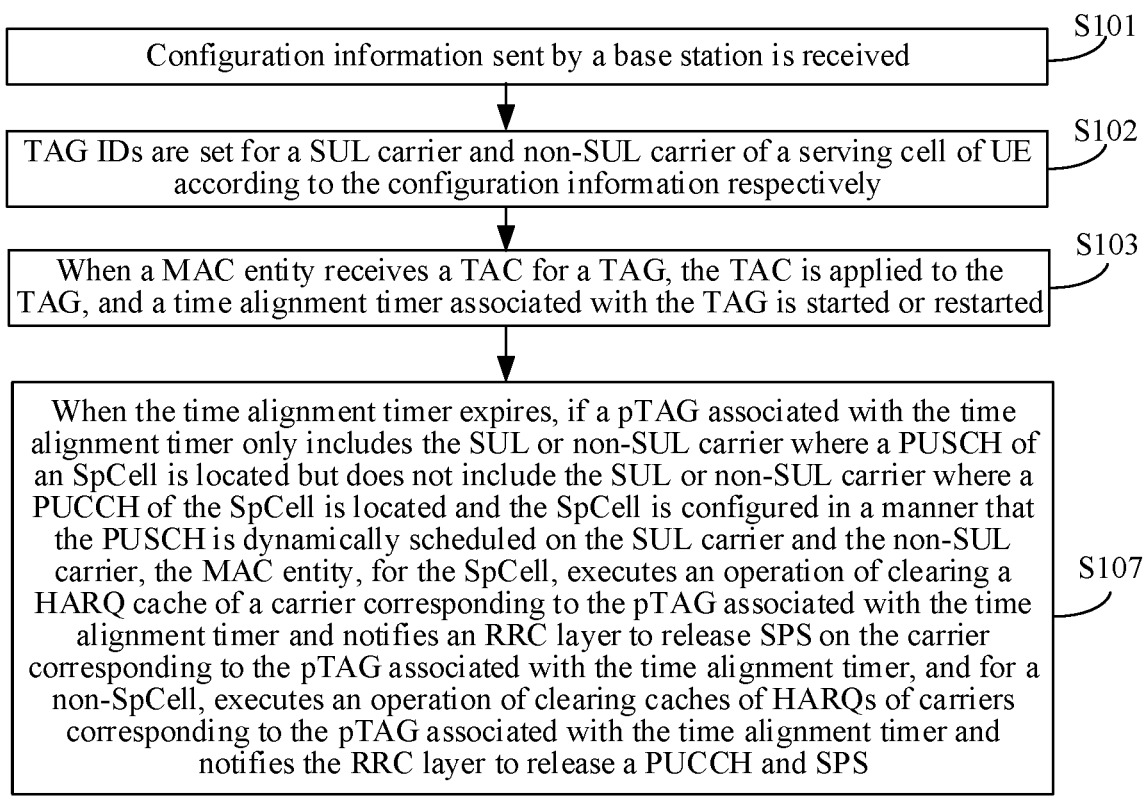
FIG. 3B is a flowchart showing yet still another TAG ID setting method according to some embodiments of the present disclosure.

FIG. 3B is a flowchart showing yet still another TAG ID setting method, according to some embodiments of the present disclosure. As shown in FIG. 3B, after S103, the TAG ID setting method can further include the following operation.

In S107, in response to that the time alignment timer expires, if the pTAG associated with the time alignment timer only includes the SUL or non-SUL carrier where a PUSCH of an SpCell is located but does not include the SUL or non-SUL carrier where a PUCCH of the SpCell is located and the SpCell is configured in a manner that the PUSCH is dynamically scheduled on the SUL carrier and the non-SUL carrier, the MAC entity, for the SpCell, executes an operation of clearing caches of a HARQs of carriers corresponding to the pTAG associated with the time alignment timer and notifies the RRC layer to release SPS on the carrier corresponding to the pTAG associated with the time alignment timer, and for a non-SpCell, executes an operation of clearing caches of HARQs of carriers corresponding to the pTAG associated with the time alignment timer and notifies the RRC layer to release a PUCCH and SPS.

In these embodiments, in response to that the time alignment timer expires, if the pTAG associated with the time alignment timer only includes the UL carrier on which the PUSCH of the SpCell is located but does not include the UL carrier on which the PUCCH of the SpCell is located and the SpCell is configured in the manner that the PUSCH can be dynamically scheduled on the SUL carrier and the non-SUL carrier, the MAC entity, for the SpCell, may execute the operation of clearing the HARQ caches of the carriers corresponding to the pTAG and notify the RRC layer to release SPS on the carrier, and for another serving cell (i.e., the non-SpCell), executes the operation of clearing the HARQ caches of carriers corresponding to the pTAG associated with the time alignment timer and notifies the RRC layer to release the PUCCH and SPS. For another condition, the caches of HARQs of all the serving cells from the MAC entity are cleared, the RRC layer is notified to release the PUCCHs and SPS of all the serving cells from the MAC entity, all configured DL and UL resource allocation (DL assignment, UL grant) of the MAC entity is cleared, and it is determined that all the time alignment timers expire.

It is to be noted that S107 may also be executed after S105, which, however, is not presented in the figure.

According to these embodiments, after the time alignment timer associated with the pTAG expires, if the pTAG associated with the time alignment timer only includes the SUL or non-SUL carrier on which the PUSCH of the SpCell is located but does not include the SUL or non-SUL carrier on which the PUCCH of the SpCell is located and the SpCell is configured in the manner that the PUSCH is dynamically scheduled on the SUL carrier and the non-SUL carrier, the MAC entity, for the SpCell, executes the operation of clearing the HARQ caches of the carriers corresponding to the pTAG associated with the time alignment timer and notifies the RRC layer to release SPS on the carrier corresponding to the pTAG associated with the time alignment timer, and for the non-SpCell, executes the operation of clearing the HARQ caches of carriers corresponding to the pTAG associated with the time alignment timer and notifies the RRC layer to release the PUCCH and SPS, to achieve the purpose of releasing the resources.

Figure 3C:
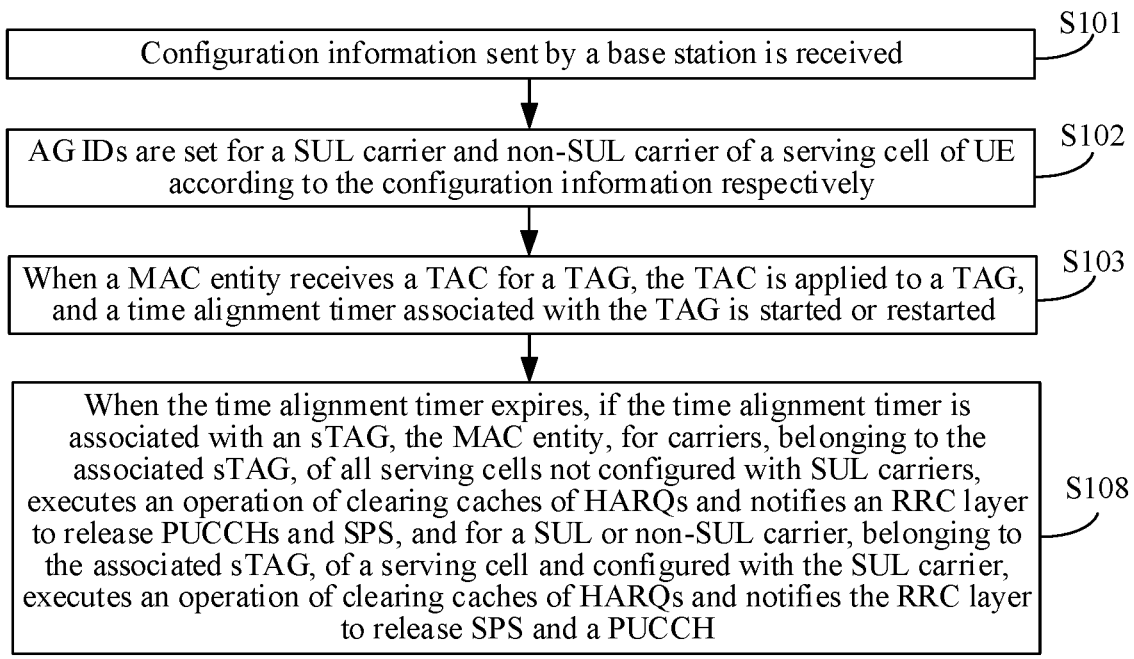
FIG. 3C is a flowchart showing yet still another TAG ID setting method according to some embodiments of the present disclosure.

FIG. 3C is a flowchart showing another TAG ID setting method, according to some embodiments of the present disclosure. As shown in FIG. 3C, after S103, the TAG ID setting method can further include the following operation.

In S108, in response to that the time alignment timer expires, if the time alignment timer is associated with an sTAG, the MAC entity, for carriers, belonging to the associated sTAG, of all serving cells not configured with SUL carriers, executes an operation of clearing caches of HARQs and notifies the RRC layer to release PUCCHs and SPS, and for a SUL or non-SUL carrier, belonging to the associated sTAG, of a serving cell configured with the SUL carrier, executes an operation of clearing caches of HARQs and notifies the RRC layer to release SPS and a PUCCH.

It is to be noted that S108 may also be executed after S105, which, however, is not presented in the figure.

According to these embodiments, after the time alignment timer associated with the sTAG expires, for all the serving cells belonging to the associated sTAG and not configured with SUL carriers, the operation of clearing the caches of HARQs is executed and the RRC layer is notified to release the PUCCHs and SPS, and for the SUL or non-SUL carrier, belonging to the associated sTAG, of the serving cell configured with the SUL carrier, the operation of clearing the HARQ cache is executed and the RRC layer is notified to release SPS and the PUCCH, to achieve the purpose of releasing the resources.

Figure 4:
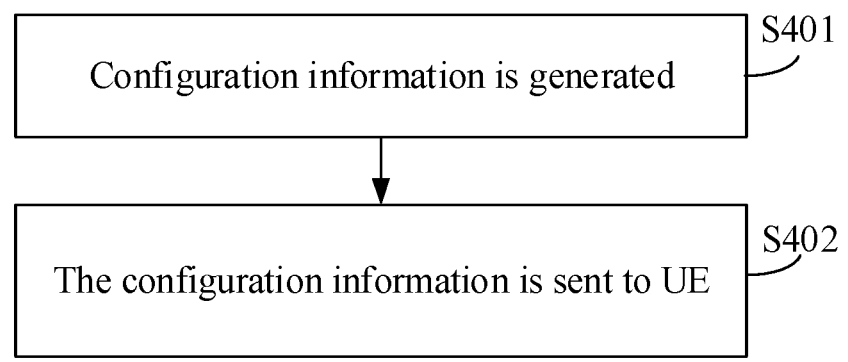
FIG. 4 is a flowchart showing a TAG ID configuration method according to some embodiments of the present disclosure.

FIG. 4 is a flowchart showing a TAG ID configuration method, according to some embodiments of the present disclosure. The embodiment is described from a base station side. As shown in FIG. 4, the TAG ID configuration method includes the following operations.

In S401, configuration information is generated, the configuration information includes a SUL carrier configured for a serving cell of UE and TAG IDs configured for the SUL carrier and a non-SUL carrier of the serving cell of the UE.

A base station may generate the configuration information, and the configuration information may include the SUL carrier configured for the serving cell of the UE and the TAG IDs configured for the SUL and non-SUL carriers of the serving cell of the UE.

In addition, the base station may also configure whether a PUCCH is on the SUL or non-SUL carrier of the serving cell, whether a PUSCH is on the SUL or non-SUL carrier and the base station may also configure that the PUSCH can be dynamically scheduled on the SUL carrier and the non-SUL carrier.

In S402, the configuration information is sent to the UE.

For UE in a connected state, the base station may send the configuration information to the UE through an RRC message.

According to these embodiments, the configuration information includes the TAG IDs configured for the SUL and non-SUL carriers of the serving cell of the UE respectively is generated and sent to the UE to enable the UE to set the TAG IDs for the SUL and non-SUL carriers of the serving cell of the UE according to the received configuration information respectively, so that the SUL and non-SUL carriers of the serving cell are set in corresponding TAGs.

Figure 5:
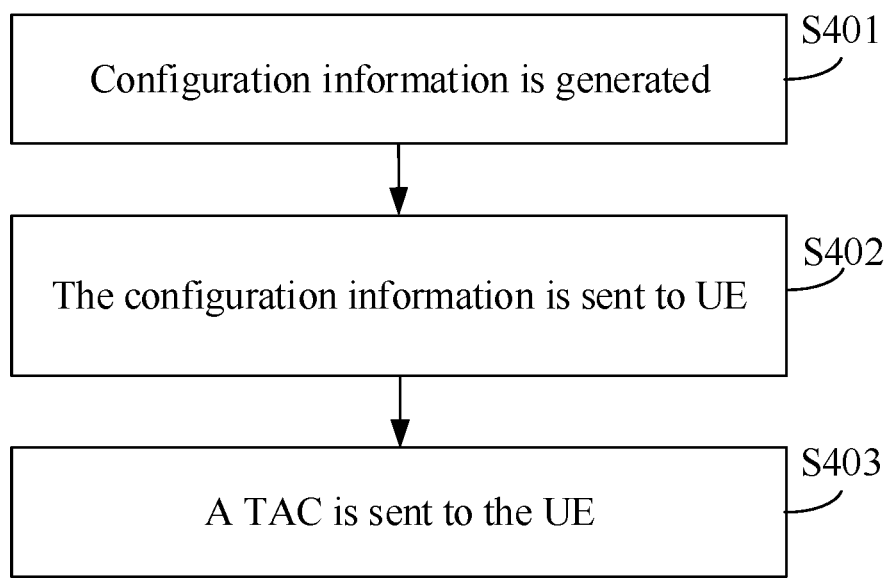
FIG. 5 is a flowchart showing another TAG ID configuration method according to some embodiments of the present disclosure.

FIG. 5 is a flowchart showing another TAG ID configuration method, according to some embodiments of the present disclosure. As shown in FIG. 5, after S402, the TAG ID configuration method can further include the following operation.

In S403, after sending the configuration information to the UE, a TAC is sent to the UE, the TAC includes a TAC for a TAG of the SUL or non-SUL carrier or a TAC for a TAG of the SUL or non-SUL carrier from an RAR of the serving cell.

In response to that the TAC is the TAC for the TAG of the SUL or non-SUL carrier, the base station may send the TAC to the UE such that the UE may apply the TAC to the TAG that the TAC is for and start or restart a time alignment timer associated with the TAG that the TAC is for.

In response to that the TAC for a TAG of the SUL or non-SUL carrier is in the RAR of the serving cell, if a random access pilot corresponding to the RAR is not selected by a MAC entity, the UE may apply the TAC to the TAG of the SUL or non-SUL carrier and start or restart a time alignment timer associated with the corresponding TAG.

In response to that the TAC for a TAG of the SUL or non-SUL carrier is in the RAR of the serving cell, if the random access pilot corresponding to the RAR is not selected by the MAC entity but the time alignment timer associated with the TAG does not run, the UE may apply the TAC to the TAG of the SUL or non-SUL carrier and start or restart the time alignment timer associated with the corresponding TAG.

According to these embodiments, the TAC is sent to the UE to control the UE whether to start or restart the time alignment timer associated with the corresponding TAG, so that a condition is provided for determining a state of the UE.

Figure 6:
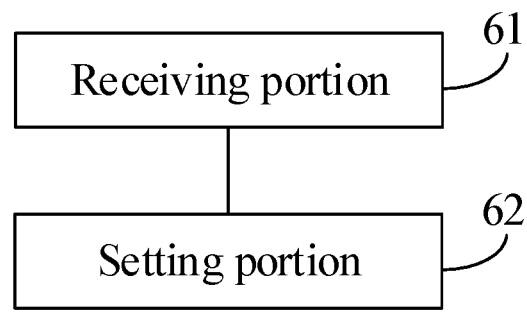
FIG. 6 is a block diagram of a TAG ID setting device according to some embodiments of the present disclosure.

FIG. 6 is a block diagram of a TAG ID setting device, according to some embodiments of the present disclosure. The device is in UE. As shown in FIG. 6, the device includes a receiving portion 61 and a setting portion 62.

The receiving portion 61 is configured to receive configuration information sent by a base station, the configuration information includes a SUL carrier configured for a serving cell of the UE.

The setting portion 62 is configured to set TAG IDs for the SUL carrier and a non-SUL carrier of the serving cell of the UE according to the configuration information received by the receiving portion 61 respectively.

In some embodiments, the configuration information can further include the TAG IDs configured for the SUL and non-SUL carriers of the serving cell of the UE respectively, and the setting portion 62 can be configured to directly set the corresponding TAG IDs for the SUL and non-SUL carriers of the serving cell of the UE according to the configuration information.

The SUL carrier and the non-SUL carrier can be in the same TAG, namely the same TAG ID is set for them. They may also be in different TAGs, namely different TAG IDs are set for them.

In some embodiments, the setting portion 62 can be configured to set, according to the configuration information, the TAG IDs for the SUL and non-SUL carriers of the serving cell of the UE in a system stipulated manner respectively.

For example, the TAG ID of the non-SUL carrier of the serving cell of the UE is set to be 0, and the TAG ID of the SUL carrier of the serving cell of the UE is set to be 1.

The configuration information can be contained in an RRC message.

According to these embodiments, the configuration information is received, and the TAG IDs are set for the SUL and non-SUL carriers of the serving cell of the UE according to the configuration information respectively, so that the SUL and non-SUL carriers of the serving cell are set in corresponding TAGs.

Figure 7:
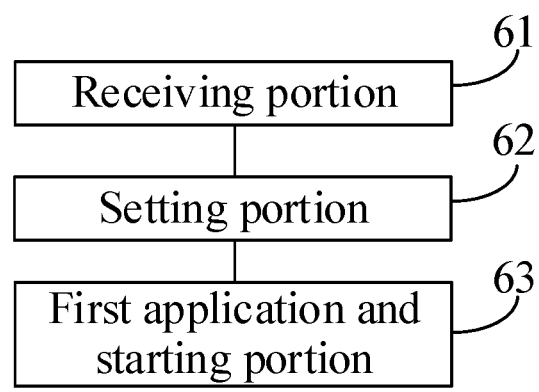
FIG. 7 is a block diagram of another TAG ID setting device according to some embodiments of the present disclosure.

FIG. 7 is a block diagram of another TAG ID setting device, according to some embodiments of the present disclosure. As shown in FIG. 7, based on the embodiment shown in FIG. 6, the device can further include a first application and starting portion 63.

The first application and starting portion 63 is configured to, after the setting portion 62 sets the TAG IDs for the SUL and non-SUL carriers of the serving cell, in response to that a MAC entity receives a TAC for a TAG, apply the TAC to the TAG and start or restart a time alignment timer associated with the TAG.

In these embodiments, in response to that the MAC entity of the UE receives a TAG MAC CE for a certain TAG, the TAG is applied to the TAG, and a time alignment timer associated with the TAG is started or restarted.

According to these embodiments, in response to that the MAC entity receives the TAC, the TAC is applied to the TAG that the TAC is for, and the time alignment timer associated with the TAG that the TAC is for is started or restarted, so that a condition is provided for subsequently determining a state of the UE.

Figure 8:
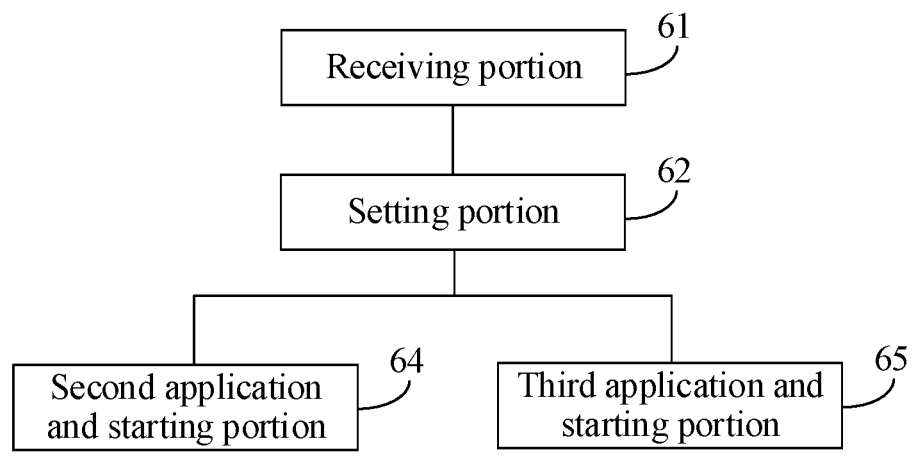
FIG. 8 is a block diagram of yet another TAG ID setting device according to some embodiments of the present disclosure.

FIG. 8 is a block diagram of yet another TAG ID setting device, according to some embodiments of the present disclosure. As shown in FIG. 8, based on the embodiment shown in FIG. 6, the device can further include a second application and starting portion 64 or a third application and starting portion 65.

The second application and starting portion 64 is configured to, after the setting portion 62 sets the TAG IDs for the SUL and non-SUL carriers of the serving cell, in response to that the MAC entity receives a TAC for a TAG of the SUL or non-SUL carrier from an RAR of the serving cell, if a random access pilot corresponding to the RAR is not selected by the MAC entity, apply the TAC to the TAG of the SUL or non-SUL carrier and start or restart a time alignment timer associated with the corresponding TAG.

The third application and starting portion 65 is configured to, after the setting portion 62 sets the TAG IDs for the SUL and non-SUL carriers of the serving cell, in response to that the MAC entity receives the TAC for a TAG of the SUL or non-SUL carrier from the RAR of the serving cell, if the random access pilot corresponding to the RAR is selected by the MAC entity but the time alignment timer associated with the TAG does not run, apply the TAC to the TAG of the SUL or non-SUL carrier and start or restart the time alignment timer associated with the corresponding TAG.

In these embodiments, in response to that the MAC entity of the UE receives a TAC in an RAR of a serving cell in a certain TAG, if a random access pilot is not selected by the MAC entity, the TAC is applied to the TAG, and a time alignment timer associated with the TAG is started or restarted. If the random access pilot corresponding to the RAR is selected by the MAC entity but the time alignment timer associated with the TAG does not run, the TAC is applied to the TAG, and the time alignment timer associated with the TAG is started or restarted. Under another condition, the received TAC is ignored.

According to these embodiments, in response to that the MAC entity receives the TAC for a TAG of the SUL or non-SUL carrier from the RAR of the serving cell, for a case that the random access pilot corresponding to the RAR is not selected by the MAC entity and for a case that the random access pilot corresponding to the RAR is selected by the MAC entity but the time alignment timer associated with the TAG does not run, the TAC is applied to the TAG of the SUL or non-SUL carrier, and the time alignment timer associated with the corresponding TAG is started or restarted, so that a condition is provided for subsequently determining the state of the UE.

Figure 9:
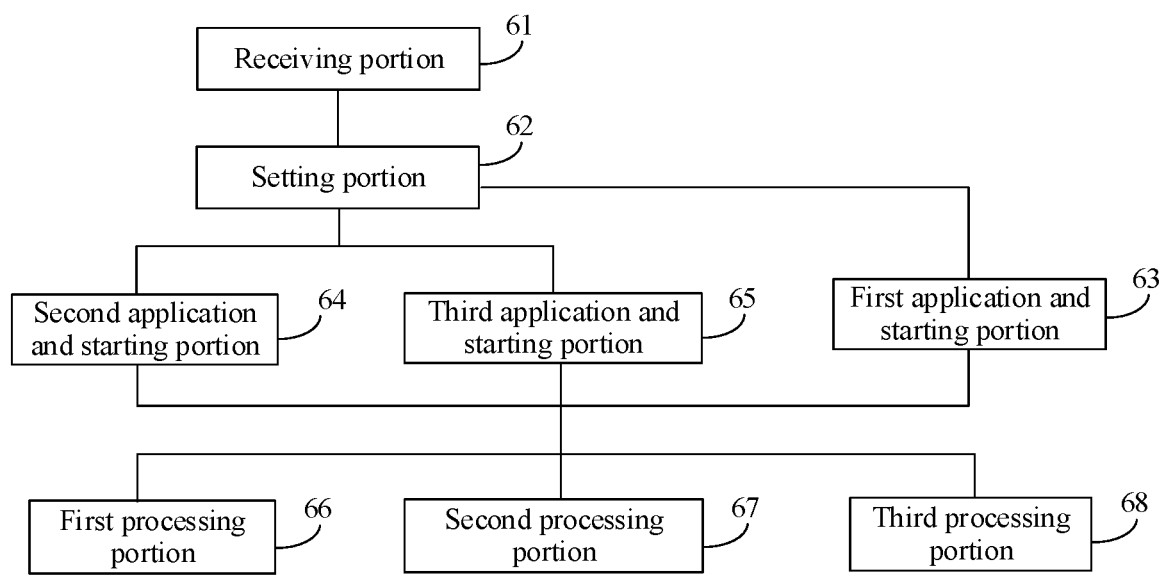
FIG. 9 is a block diagram of still another TAG ID setting device according to some embodiments of the present disclosure.

FIG. 9 is a block diagram of still another TAG ID setting device, according to some embodiments of the present disclosure. As shown in FIG. 9, based on the embodiment shown in FIG. 7 or FIG. 8, the device can further include a first processing portion 66, a second processing portion 67 or a third processing portion 68.

The first processing portion 66 is configured to, in response to that the time alignment timer started or restarted by the first application and starting portion 63, the second application and starting portion 64 or the third application and starting portion 65 expires, if the time alignment timer is associated with a pTAG, by the MAC entity, clear caches of HARQs of all serving cells from the MAC entity, notify an RRC layer to release PUCCHs and SPS of all the serving cells from the MAC entity, clear all configured DL and UL resource allocation from the MAC entity and determine that all time alignment timers expire.

The pTAG can be a TAG including a SUL or non-SUL carrier of an SpCell, can be a TAG where a UL carrier supporting transmission of a PUCCH of an SpCell or a UL carrier supporting transmission of a PUCCH of an SpCell and supporting contention-based random access is located, may also be a TAG where a UL carrier supporting transmission of a PUCCH of an SpCell or a UL carrier supporting transmission of a PUCCH of an SpCell and supporting contention-based random access is located and a TAG where a UL carrier supporting transmission of a PUSCH of an SpCell is located, and may also be a TAG where a UL carrier supporting transmission of a PUCCH of an SpCell or a UL carrier supporting transmission of a PUCCH of an SpCell and supporting contention-based random access is located or a TAG where a UL carrier supporting transmission of a PUSCH of an SpCell is located. The UL carrier may include a SUL or non-SUL carrier. Another TAG other than the pTAG is a sTAG.

The second processing portion 67 is configured to, in response to that the time alignment timer started or restarted by the first application and starting portion 63, the second application and starting portion 64 or the third application and starting portion 65 expires, if the pTAG associated with the time alignment timer only includes the SUL or non-SUL carrier where a PUSCH of an SpCell is located but does not include the SUL or non-SUL carrier where a PUCCH of the SpCell is located and the SpCell is configured in a manner that the PUSCH is dynamically scheduled on the SUL carrier and the non-SUL carrier, by the MAC entity, for the SpCell, execute an operation of clearing caches of HARQs of carriers corresponding to the pTAG associated with the time alignment timer and notify the RRC layer to release SPS on the carrier corresponding to the pTAG associated with the time alignment timer, and for a non-SpCel, execute an operation of clearing caches of HARQs of carriers corresponding to the pTAG associated with the time alignment timer and notify the RRC layer to release a PUCCH and SPS.

In these embodiments, in response to that the time alignment timer expires, if the pTAG associated with the time alignment timer only includes the UL carrier where the PUSCH of the SpCell is located but does not include the UL carrier where the PUCCH of the SpCell is located and the SpCell is configured in the manner that the PUSCH can be dynamically scheduled on the SUL carrier and the non-SUL carrier, the MAC entity, for the SpCell, may execute the operation of clearing the HARQ caches of the carriers corresponding to the pTAG and notify the RRC layer to release SPS on the carrier, and for another serving cell (i.e., the non-SpCell), executes the operation of clearing the HARQ cache of carriers corresponding to the pTAG and notifies the RRC layer to release the PUCCH and SPS. For another condition, the caches of HARQs of all the serving cells from the MAC entity are cleared, the RRC layer is notified to release the PUCCHs and SPS of all the serving cells from the MAC entity, all configured DL and UL resource allocation (DL assignment, UL grant) from the MAC entity is cleared, and it is determined that all the time alignment timers expire.

The third processing portion 68 is configured to, in response to that the time alignment timer started or restarted by the first application and starting portion 63, the second application and starting portion 64 or the third application and starting portion 65 expires, if the time alignment timer is associated with an sTAG, by the MAC entity, for carriers, belonging to the associated sTAG, of all serving cells not configured with SUL carriers, execute an operation of clearing caches of HARQs and notify the RRC layer to release PUCCHs and SPS, and for a SUL or non-SUL carrier, belonging to the associated sTAG, of a serving cell and configured with the SUL carrier, execute an operation of clearing caches of HARQs and notify the RRC layer to release SPS and a PUCCH.

According to these embodiments, after the time alignment timer associated with the pTAG expires, the caches of HARQs of all the serving cells are cleared from the MAC entity, the RRC layer is notified to release the PUCCHs and SPS of all the serving cells from the MAC entity, and all configured DL and UL resource allocation is cleared from the MAC entity, to achieve a purpose of releasing resources. After the time alignment timer associated with the pTAG expires, if the pTAG associated with the time alignment timer only includes the SUL or non-SUL carrier where the PUSCH of the SpCell is located but does not include the SUL or non-SUL carrier where the PUCCH of the SpCell is located and the SpCell is configured in the manner that the PUSCH is dynamically scheduled on the SUL carrier and the non-SUL carrier, the MAC entity, for the SpCell, executes the operation of clearing the HARQ caches of the carriers corresponding to the pTAG associated with the time alignment timer and notifies the RRC layer to release SPS on the carrier corresponding to the pTAG associated with the time alignment timer, and for the non-SpCell, executes the operation of clearing the HARQ caches of carriers corresponding to the pTAG associated with the time alignment timer and notifies the RRC layer to release the PUCCH and SPS, to achieve the purpose of releasing the resources. After the time alignment timer associated with the sTAG expires, for all the serving cells belonging to the associated sTAG and not configured with SUL carriers, the operation of clearing the caches of HARQs is executed and the RRC layer is notified to release the PUCCHs and SPS, and for the SUL or non-SUL carrier, belonging to the associated sTAG, of the serving cell configured with the SUL carrier, the operation of clearing the HARQ cache is executed and the RRC layer is notified to release SPS and the PUCCH, to achieve the purpose of releasing the resources.

Figure 10:
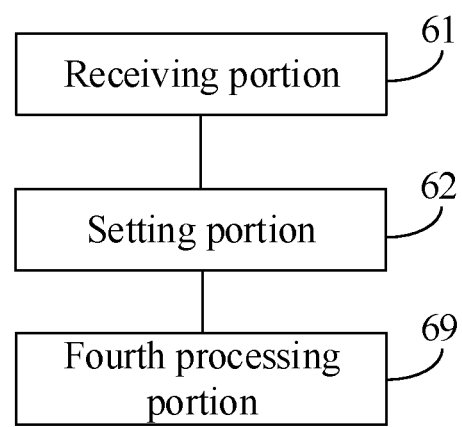
FIG. 10 is a block diagram of yet still another TAG ID setting device according to some embodiments of the present disclosure.

FIG. 10 is a block diagram of yet still another TAG ID setting device, according to some embodiments of the present disclosure. As shown in FIG. 10, based on the embodiment shown in FIG. 6, the device can further include a fourth processing portion 69.

The fourth processing portion 69 is configured to, after the setting portion 62 sets the TAG IDs for the SUL and non-SUL carriers of the serving cell, in response to that a time alignment timer associated with a TAG corresponding to a serving cell does not run, not initiate, by the MAC entity, any UL transmission other than random access pilot transmission in the serving cell or on a SUL carrier and non-SUL carrier, associated with the TAG, of the serving cell.

According to these embodiments, in response to that a time alignment timer associated with a TAG corresponding to a serving cell does not run, the MAC entity may not initiate any UL transmission other than random access pilot transmission in the serving cell or on a SUL carrier and non-SUL carrier, associated with the TAG, of the serving cell, to avoid invalid UL transmission.

Figure 11:
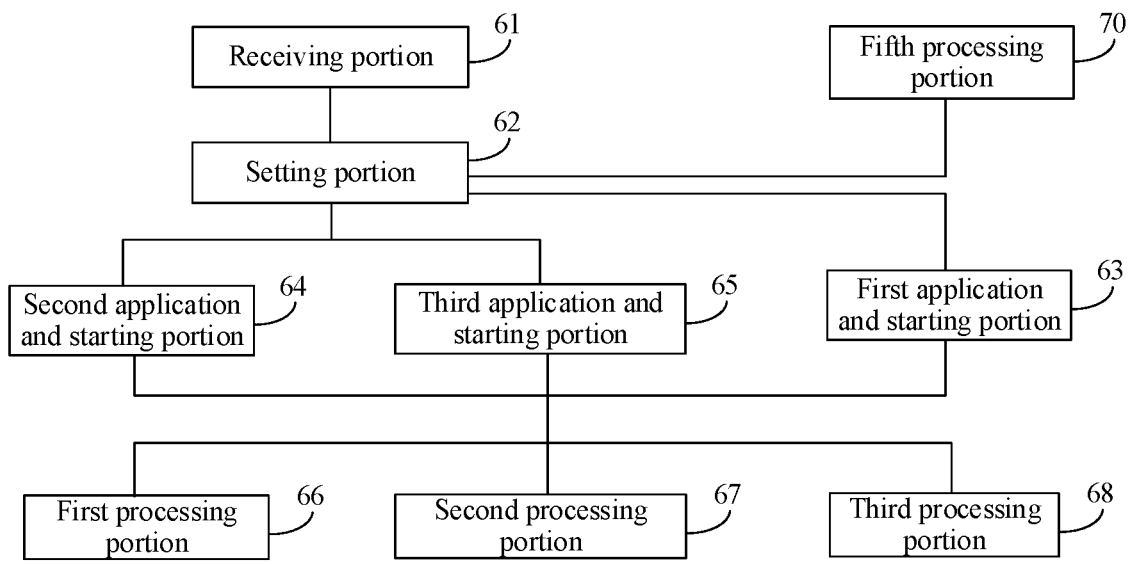
FIG. 11 is a block diagram of yet still another TAG ID setting device according to some embodiments of the present disclosure.

FIG. 11 is a block diagram of yet still another TAG ID setting device, according to some embodiments of the present disclosure. As shown in FIG. 11, based on the embodiment shown in FIG. 9, the device can further include a fifth processing portion 70.

The fifth processing portion 70 is configured to, after the setting portion 62 sets the TAG IDs for the SUL and non-SUL carriers of the serving cell, in response to that the time alignment timer associated with the pTAG does not run, by the MAC entity, initiate random access pilot transmission in the SpCell and not initiate any UL transmission in another serving cell.

According to these embodiments, in response to that the time alignment timer associated with the pTAG does not run, the MAC entity may initiate random access pilot transmission in the SpCell and may not initiate any UL transmission in another serving cell, to avoid invalid UL transmission.

Figure 12:
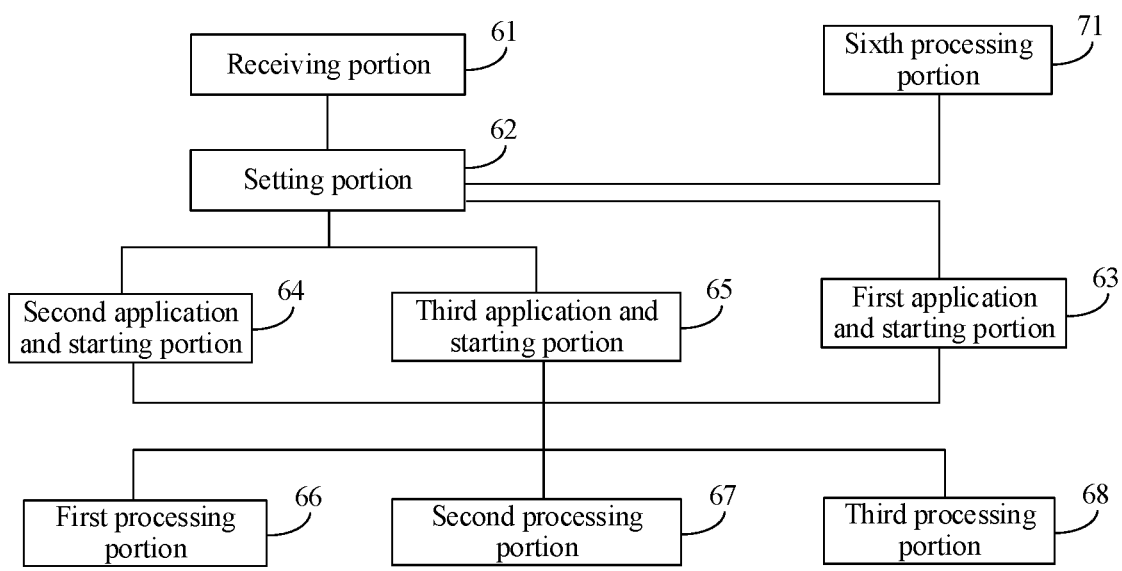
FIG. 12 is a block diagram of yet still another TAG ID setting device according to some embodiments of the present disclosure.

FIG. 12 is a block diagram of ye still another TAG ID setting device, according to some embodiments of the present disclosure. As shown in FIG. 12, based on the embodiment shown in FIG. 9, the device can further include a sixth processing portion 71.

The sixth processing portion 71 is configured to, after the setting portion 62 sets the TAG IDs for the SUL and non-SUL carriers of the serving cell, in an SCell or on a UL carrier of the SCell or on a UL carrier, belonging to an sTAG, of the SpCell, in response to that UL transmission exceeds a maximum UL transmission time difference or exceeds a maximum UL transmission time difference between two TAGs that capable of being processed by the UE, by the MAC entity, stop the UL transmission and determine that a time alignment timer associated with the SCell or the UL carrier of the SCell or the UL carrier, belonging to the sTAG, of the SpCell expires, the UL carrier includes a SUL or non-SUL carrier.

According to these embodiments, in response to that the UL transmission in the SCell or the UL carrier of the SCell or the UL carrier, belonging to the sTAG, of the SpCell exceeds the maximum UL transmission time difference or exceeds the maximum UL transmission time difference between the two TAGs capable of being processed by the UE, the MAC entity stops the UL transmission to avoid invalid UL transmission.

Figure 13:
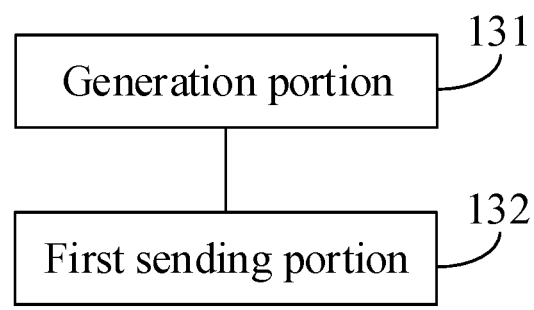
FIG. 13 is a block diagram of a TAG ID configuration device according to some embodiments of the present disclosure.

FIG. 13 is a block diagram of a TAG ID configuration device, according to some embodiments of the present disclosure. The device is in a base station. As shown in FIG. 13, the device includes a generation portion 131 and a first sending portion 132.

The generation portion 131 is configured to generate configuration information, the configuration information includes a SUL carrier configured for a serving cell of UE and TAG IDs configured for the SUL carrier and a non-SUL carriers of the serving cell of the UE.

The base station may generate the configuration information, and the configuration information may include the SUL carrier configured for the serving cell of the UE and the TAG IDs configured for the SUL and non-SUL carriers of the serving cell of the UE.

In addition, the base station may also configure whether a PUCCH is on the SUL or non-SUL carrier of the serving cell, whether a PUSCH is on the SUL or non-SUL carrier and the base station may also configure that the PUSCH can be dynamically scheduled on the SUL carrier and the non-SUL carrier.

The first sending portion 132 is configured to send the configuration information generated by the generation portion 131 to the UE.

For UE in a connected state, the base station may send the configuration information to the UE through an RRC message.

According to these embodiments, the configuration information including the TAG IDs configured for the SUL and non-SUL carriers of the serving cell of the UE respectively is generated and sent to the UE to enable the UE to set the TAG IDs for the SUL and non-SUL carriers of the serving cell of the UE according to the received configuration information respectively, so that the SUL and non-SUL carriers of the serving cell are set in corresponding TAGs.

Figure 14:
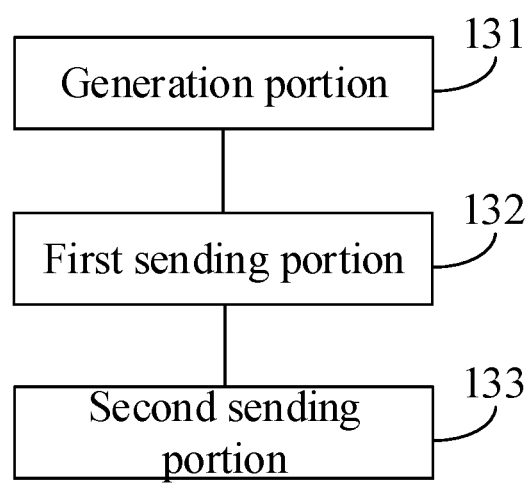
FIG. 14 is a block diagram of another TAG ID configuration device according to some embodiments of the present disclosure.

FIG. 14 is a block diagram of another TAG ID configuration device, according to some embodiments of the present disclosure. As shown in FIG. 14, based on the embodiment shown in FIG. 13, the device can further include a second sending portion 133.

The second sending portion 133 is configured to, after the first sending portion 132 sends the configuration information to the UE, send a TAC to the UE, the TAC includes a TAC for a TAG of the SUL or non-SUL carrier or a TAC for a TAG of the SUL or non-SUL carrier from an RAR of the serving cell.

In response to that the TAC is the TAC for the TAG of the SUL or non-SUL carrier, the base station may send the TAC to the UE such that the UE may apply the TAC to the TAG that the TAC is for and start or restart a time alignment timer associated with the TAG that the TAC is for.

In response to that the TAC for a TAG of the SUL or non-SUL carrier is in the RAR of the serving cell, if a random access pilot corresponding to the RAR is not selected by a MAC entity, the UE may apply the TAC to the TAG of the SUL or non-SUL carrier and start or restart a time alignment timer associated with the corresponding TAG.

In response to that the TAC for a TAG of the SUL or non-SUL carrier is in the RAR of the serving cell, if the random access pilot corresponding to the RAR is not selected by the MAC entity but the time alignment timer associated with the TAG does not run, the UE may apply the TAC to the TAG of the SUL or non-SUL carrier and start or restart the time alignment timer associated with the corresponding TAG.

According to these embodiments, the TAC is sent to the UE to control the UE whether to start or restart the time alignment timer associated with the corresponding TAG, so that a condition is provided for determining a state of the UE.

Figure 15:
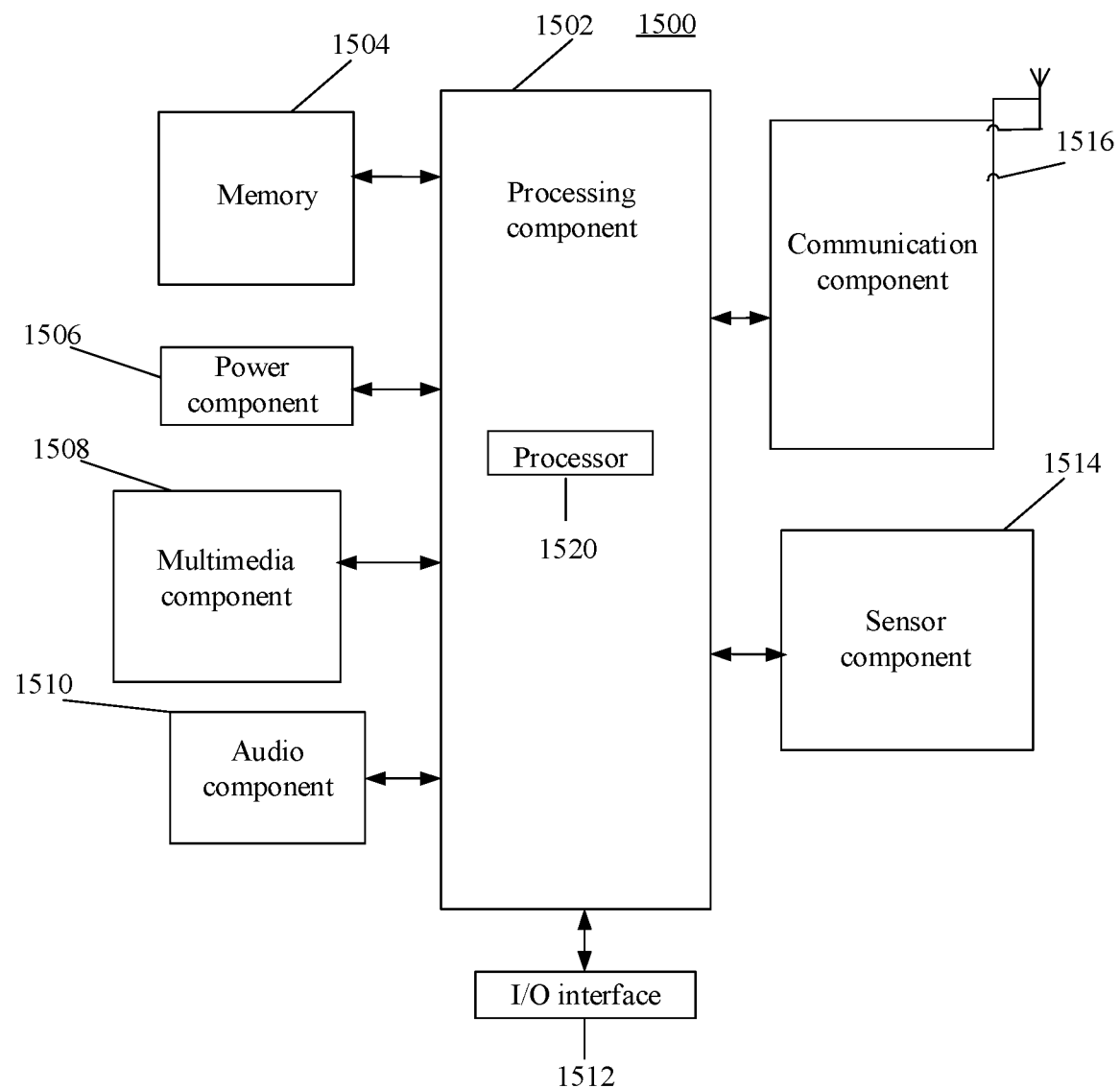
FIG. 15 is a block diagram of a TAG ID setting device according to some embodiments of the present disclosure.

FIG. 15 is a block diagram of a TAG ID setting device, according to some embodiments of the present disclosure. For example, the device 1500 can be UE such as a mobile phone, a computer, a digital broadcast terminal, a messaging device, a gaming console, a tablet, a medical device, exercise equipment and a personal digital assistant.

Referring to FIG. 15, the device 1500 may include one or more of the following components: a processing component 1502, a memory 1504, a power component 1506, a multimedia component 1508, an audio component 1510, an Input/Output (I/O) interface 1512, a sensor component 1514, and a communication component 1516.

The processing component 1502 typically controls overall operations of the device 1500, such as the operations associated with display, telephone calls, data communications, camera operations, and recording operations. The processing component 1502 may include one or more processors 1520 to execute instructions to perform all or part of the operations in the abovementioned method. Moreover, the processing component 1502 may include one or more modules which facilitate interaction between the processing component 1502 and the other components. For instance, the processing component 1502 may include a multimedia module to facilitate interaction between the multimedia component 1508 and the processing component 1502.

One processor 1520 in the processing component 1502 can be configured to:
receive configuration information sent by a base station, the configuration information including a SUL carrier configured for a serving cell of UE; and
set TAG IDs for the SUL and non-SUL carriers of the serving cell of the UE according to the configuration information respectively.

The memory 1504 is configured to store various types of data to support the operation of the device 1500. Examples of such data include instructions for any applications or methods operated on the device 1500, contact data, phonebook data, messages, pictures, video, etc. The memory 1504 can be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1506 provides power for various components of the device 1500. The power component 1506 may include a power management system, one or more power supplies, and other components associated with generation, management and distribution of power for the device 1500.

The multimedia component 1508 includes a screen providing an output interface between the device 1500 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen can be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1508 includes a front camera and/or a rear camera. The front camera and/or the rear camera may receive external multimedia data in response to that the device 1500 is in an operation mode, such as a photographing mode or a video mode. Each of the front camera and the rear camera can be a fixed optical lens system or have focusing and optical zooming capabilities.

The audio component 1510 is configured to output and/or input an audio signal. For example, the audio component 1510 includes a Microphone (MIC), and the MIC is configured to receive an external audio signal in response to that the device 1500 is in the operation mode, such as a call mode, a recording mode and a voice recognition mode. The received audio signal can further be stored in the memory 1504 or sent through the communication component 1516. In some embodiments, the audio component 1510 further includes a speaker configured to output the audio signal.

The I/O interface 1512 provides an interface between the processing component 1502 and a peripheral interface module, and the peripheral interface module can be a keyboard, a click wheel, a button and the like. The button may include, but not limited to: a home button, a volume button, a starting button and a locking button.

The sensor component 1514 includes one or more sensors configured to provide status assessment in various aspects for the device 1500. For instance, the sensor component 1514 may detect an on/off status of the device 1500 and relative positioning of components, such as a display and small keyboard of the device 1500, and the sensor component 1514 can further detect a change in a position of the device 1500 or a component of the device 1500, presence or absence of contact between the user and the device 1500, orientation or acceleration/deceleration of the device 1500 and a change in temperature of the device 1500. The sensor component 1514 may include a proximity sensor configured to detect presence of an object nearby without any physical contact. The sensor component 1514 may also include a light sensor, such as a Complementary Metal Oxide Semiconductor (CMOS) or Charge Coupled Device (CCD) image sensor, configured for use in an imaging application. In some embodiments, the sensor component 1514 may also include an acceleration sensor, a gyroscope sensor, a magnetic sensor, a pressure sensor or a temperature sensor.

The communication component 1516 is configured to facilitate wired or wireless communication between the device 1500 and another device. The device 1500 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 1516 receives a broadcast signal or broadcast associated information from an external broadcast management system through a broadcast channel. In some embodiments of the present disclosure, the communication component 1516 further includes a Near Field Communication (NFC) module to facilitate short-range communication. For example, the NFC module can be implemented based on a Radio Frequency Identification (RFID) technology, an Infrared Data Association (IrDA) technology, an Ultra-Wide Band (UWB) technology, a Bluetooth (BT) technology and another technology.

In some embodiments of the present disclosure, the device 1500 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the TAG ID setting method.

In some embodiments of the present disclosure, there is also provided a non-transitory computer-readable storage medium including an instruction, such as the memory 1504 including an instruction, and the instruction can be executed by the processor 1520 of the device 1500 to implement the abovementioned method. For example, the non-transitory computer-readable storage medium can be a ROM, a Compact Disc Read-Only Memory (CD-ROM), a magnetic tape, a floppy disc, an optical data storage device and the like.

Figure 16:
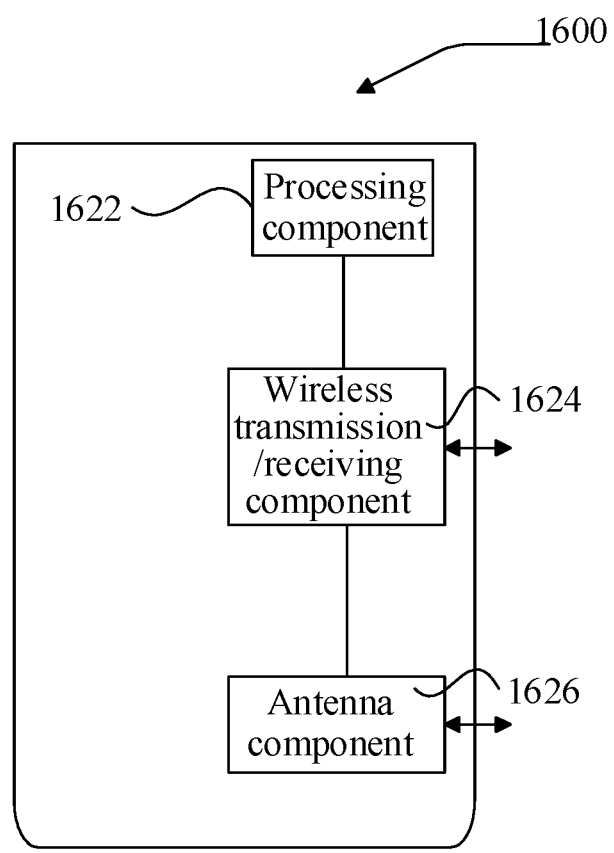
FIG. 16 is a block diagram of a TAG ID configuration device according to some embodiments of the present disclosure.

FIG. 16 is a block diagram of a TAG ID configuration device, according to some embodiments of the present disclosure. The device 1600 can be provided as a base station. Referring to FIG. 16, the device 1600 includes a processing component 1622, a wireless transmission/receiving component 1624, an antenna component 1626 and a wireless interface-specific signal processing part, and the processing component 1622 can further include one or more processors.

One processor in the processing component 1622 can be configured to:

generate configuration information, the configuration information including a SUL carrier configured for a serving cell of UE and TAG IDs configured for the SUL and non-SUL carriers of the serving cell of the UE; and send the configuration information to the UE.

In some embodiments of the present disclosure, there is also provided a non-transitory computer-readable storage medium including an instruction, and the instruction can be executed by the processing component 1622 of the device 1600 to implement the TAG ID configuration method. For example, the non-transitory computer-readable storage medium can be a ROM, a CD-ROM, a magnetic tape, a floppy disc, an optical data storage device and the like.

In some embodiments, the configuration information is received, and the TAG IDs are set for the SUL and non-SUL carriers of the serving cell of the UE according to the configuration information respectively, so that the SUL and non-SUL carriers of the serving cell are set in corresponding TAGs.

In some embodiments, the configuration information including the TAG IDs configured for the SUL and non-SUL carriers of the serving cell of the UE respectively is generated and sent to the UE to enable the UE to set the TAG IDs for the SUL and non-SUL carriers of the serving cell of the UE according to the received configuration information respectively, so that the SUL and non-SUL carriers of the serving cell are set in the corresponding TAGs.

In some embodiments, the configuration information can further include the TAG IDs configured for the SUL and non-SUL carriers of the serving cell of the UE respectively, and the operation that the TAG IDs are set for the SUL and non-SUL carriers of the serving cell of the UE according to the configuration information respectively may include the following operations:

the corresponding TAG IDs are directly set for the SUL and non-SUL carriers of the serving cell of the UE according to the configuration information; or the operation that the TAG IDs are set for the SUL and non-SUL carriers of the serving cell of the UE according to the configuration information respectively may include the following operations:

the TAG IDs are set for the SUL and non-SUL carriers of the serving cell of the UE according to the configuration information in a stipulated manner respectively.

In some embodiments, the method can further include the following operations:

in response to that a Media Access Control (MAC) entity receives a TAC for a TAG, the TAC is applied to the TAGs, and a time alignment timer associated with the TAG is started or restarted.

In some embodiments, the method can further include the following operations:

in response to that the MAC entity receives a TAC for a TAG of the SUL or non-SUL carrier from a Random Access Response (RAR) of the serving cell, if a random access pilot corresponding to the RAR is not selected by the MAC entity, the TAC is applied to the TAG of the SUL or non-SUL carrier, and a time alignment timer associated with the corresponding TAG is started or restarted; or in response to that the MAC entity receives the TAC for a TAG of the SUL or non-SUL carrier from the RAR of the serving cell, if the random access pilot corresponding to the RAR is selected by the MAC entity but the time alignment timer associated with the TAG does not run, the TAC is applied to the TAG of the SUL or non-SUL carrier, and the time alignment timer associated with the corresponding TAG is started or restarted.

In some embodiments, the method can further include the following operations:

in response to that the time alignment timer expires, if the time alignment timer is associated with a pTAG, the MAC entity clears caches of HARQs of all serving cells from the MAC entity, notifies a Radio Resource Control (RRC) layer to release PUCCHs and SPS of all the serving cells from the MAC entity, clears all configured DL and UL resource allocation from the MAC entity and determines that all time alignment timers expire; or in response to that the time alignment timer expires, if the pTAG associated with the time alignment timer only includes the SUL or non-SUL carrier where a Physical Uplink Shared Channel (PUSCH) of a Special Cell (SpCell) is located but does not include the SUL or non-SUL carrier where a PUCCH of the SpCell is located and the SpCell is configured in a manner that the PUSCH is dynamically scheduled on the SUL carrier and the non-SUL carrier, the MAC entity, for the SpCell, executes an operation of clearing caches of HARQs of carriers corresponding to the pTAG associated with the time alignment timer and notifies the RRC layer to release SPS on the carrier corresponding to the pTAG associated with the time alignment timer, and for a non-SpCell, executes an operation of clearing caches of HARQs of carriers corresponding to the pTAG associated with the time alignment timer and notifies the RRC layer to release a PUCCH and SPS; or in response to that the time alignment timer expires, if the time alignment timer is associated with an sTAG, the MAC entity, for carriers, belonging to the associated sTAG, of all serving cells not configured with SUL carriers, executes an operation of clearing caches of HARQs and notifies the RRC layer to release PUCCHs and SPS, and for a SUL or non-SUL carrier, belonging to the associated sTAG, of a serving cell configured with the SUL carrier, executes an operation of clearing caches of HARQs and notifies the RRC layer to release SPS and a PUCCH.

In some embodiments, the pTAG can be a TAG including a SUL or non-SUL carrier of an SpCell, and the sTAG can be another TAG other than the pTAG; or the pTAG can be a TAG where a UL carrier supporting transmission of a PUCCH of an SpCell or a UL carrier supporting transmission of a PUCCH of an SpCell and supporting contention-based random access is located, and the sTAG can be another TAG other than the pTAG, the UL carrier including a SUL or non-SUL carrier; or the pTAG can be a TAG where a UL carrier supporting transmission of a PUCCH of an SpCell or a UL carrier supporting transmission of a PUCCH of an SpCell and supporting contention-based random access is located and a TAG where a UL carrier supporting transmission of a PUSCH of an SpCell is located, and the sTAG can be another TAG other than the pTAG, the UL carrier including a SUL or non-SUL carrier; or the pTAG can be a TAG where a UL carrier supporting transmission of a PUCCH of an SpCell or a UL carrier supporting transmission of a PUCCH of an SpCell and supporting contention-based random access is located or a TAG where a UL carrier supporting transmission of a PUSCH of an SpCell is located, and the sTAG can be another TAG other than the pTAG, the UL carrier including a SUL or non-SUL carrier.

In some embodiments, the method can further include the following operations:

in response to that a time alignment timer associated with a TAG corresponding to a serving cell does not run, the MAC entity may not initiate any UL transmission other than random access pilot transmission in the serving cell or on a SUL carrier and non-SUL carrier, associated with the TAG, of the serving cell.

In some embodiments, the method can further include the following operations:

in response to that the time alignment timer associated with the pTAG does not run, the MAC entity may initiate random access pilot transmission in the SpCell and may not initiate any UL transmission in another serving cell.

In some embodiments, the method can further include the following operations:

in another serving cell (Secondary Cell (SCell)) other than the SpCell or on a UL carrier of the SCell or on a UL carrier, belonging to an sTAG, of the SpCell, in response to that UL transmission exceeds a maximum UL transmission time difference or exceeds a maximum UL transmission time difference between two TAGs that capable of being processed by the UE, the MAC entity stops the UL transmission and determines that a time alignment timer associated with the SCell or the UL carrier of the SCell or the UL carrier, belonging to the sTAG, of the SpCell expires, the UL carrier including a SUL or non-SUL carrier.

According to another aspect of the embodiments of the present disclosure, a TAG ID configuration method is provided, which can be applied to a base station and include the following operations:

configuration information is generated, the configuration information including a SUL carrier configured for a serving cell of UE and TAG IDs configured for the SUL carrier and a non-SUL carriers of the serving cell of the UE; and the configuration information is sent to the UE.

In some embodiments, the method can further include the following operations:

after sending the configuration information to the UE, a TAC is sent to the UE, the TAC including a TAC for a TAG of the SUL or non-SUL carrier or a TAC for a TAG of the SUL or non-SUL carrier from an RAR of the serving cell.

The device embodiments can substantially correspond to the method embodiments, and thus related portions can refer to descriptions of the method embodiments. Units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments.

Foe example, a TAG ID setting device can be provided, which can be applied to UE and include:

a receiving module, configured to receive configuration information sent by a base station, the configuration information including a SUL carrier configured for a serving cell of the UE; and a setting module, configured to set TAG IDs for the SUL carrier and non-SUL carrier of the serving cell of the UE according to the configuration information received by the receiving module respectively.

In some embodiments, the configuration information can further include the TAG IDs configured for the SUL and non-SUL carriers of the serving cell of the UE respectively, and the setting module can be configured to:

directly set the corresponding TAG IDs for the SUL and non-SUL carriers of the serving cell of the UE according to the configuration information; or the setting module can be configured to:

set the TAG IDs for the SUL and non-SUL carriers of the serving cell of the UE according to the configuration information in a stipulated manner respectively.

In some embodiments, the device can further include:

a first application and starting module, configured to, after the setting module sets the TAG IDs for the SUL and non-SUL carriers of the serving cell, in response to that a MAC entity receives a TAC for a TAG, apply the TAC to the TAG and start or restart a time alignment timer associated with the TAG.

In some embodiments, the device can further include:

a second application and starting module, configured to, after the setting module sets the TAG IDs for the SUL and non-SUL carriers of the serving cell, in response to that the MAC entity receives a TAC for a TAG of the SUL or non-SUL carrier from an RAR of the serving cell, if a random access pilot corresponding to the RAR is not selected by the MAC entity, apply the TAC to the TAG of the SUL or non-SUL carrier and start or restart a time alignment timer associated with the corresponding TAG; or a third application and starting module, configured to, after the setting module sets the TAG IDs for the SUL and non-SUL carriers of the serving cell, in response to that the MAC entity receives the TAC for a TAG of the SUL or non-SUL carrier from the RAR of the serving cell, if the random access pilot corresponding to the RAR is selected by the MAC entity but the time alignment timer associated with the TAG does not run, apply the TAC to the TAG of the SUL or non-SUL carrier and start or restart the time alignment timer associated with the corresponding TAG.

In some embodiments, the device can further include:

a first processing module, configured to, in response to that the time alignment timer started or restarted by the first application and starting module, the second application and starting module or the third application and starting module expires, if the time alignment timer is associated with a pTAG, by the MAC entity, clear caches of HARQs of all serving cells from the MAC entity, notify an RRC layer to release PUCCHs and SPS of all the serving cells from the MAC entity, clear all configured DL and UL resource allocation from the MAC entity and determine that all time alignment timers expire; or a second processing module, configured to, in response to that the time alignment timer started or restarted by the first application and starting module, the second application and starting module or the third application and starting module expires, if the pTAG associated with the time alignment timer only includes the SUL or non-SUL carrier where a PUSCH of an SpCell is located but does not include the SUL or non-SUL carrier where a PUCCH of the SpCell is located and the SpCell is configured in a manner that the PUSCH is dynamically scheduled on the SUL carrier and the non-SUL carrier, by the MAC entity, for the SpCell, execute an operation of clearing caches of HARQs of carriers corresponding to the pTAG associated with the time alignment timer and notify the RRC layer to release SPS on the carrier corresponding to the pTAG associated with the time alignment timer, and for a non-SpCell, execute an operation of clearing caches of HARQs of carriers corresponding to the pTAG associated with the time alignment timer and notify the RRC layer to release a PUCCH and SPS; or a third processing module, configured to, in response to that the time alignment timer started or restarted by the first application and starting module, the second application and starting module or the third application and starting module expires, if the time alignment timer is associated with an sTAG, by the MAC entity, for carriers, belonging to the associated sTAG, of all serving cells not configured with SUL carriers, execute an operation of clearing Caches of HARQs and notify the RRC layer to release PUCCHs and SPS, and for a SUL or non-SUL carrier, belonging to the associated sTAG, of a serving cell configured with the SUL carrier, execute an operation of clearing caches of HARQs and notify the RRC layer to release SPS and a PUCCH.

In some embodiments, the pTAG can be a TAG including a SUL or non-SUL carrier of an SpCell, and the sTAG can be another TAG other than the pTAG; or the pTAG can be a TAG where a UL carrier supporting transmission of a PUCCH of an SpCell or a UL carrier supporting transmission of a PUCCH of an SpCell and supporting contention-based random access is located, and the sTAG can be another TAG other than the pTAG, the UL carrier including a SUL or non-SUL carrier; or the pTAG can be a TAG where a UL carrier supporting transmission of a PUCCH of an SpCell or a UL carrier supporting transmission of a PUCCH of an SpCell and supporting contention-based random access is located and a TAG where a UL carrier supporting transmission of a PUSCH of an SpCell is located, and the sTAG can be another TAG other than the pTAG, the UL carrier including a SUL or non-SUL carrier; or the pTAG can be a TAG where a UL carrier supporting transmission of a PUCCH of an SpCell or a UL carrier supporting transmission of a PUCCH of an SpCell and supporting contention-based random access is located or a TAG where a UL carrier supporting transmission of a PUSCH of an SpCell is located, and the sTAG can be another TAG other than the pTAG, the UL carrier including a SUL or non-SUL carrier.

In some embodiments, the device can further include:

a fourth processing module, configured to, after the setting module sets the TAG IDs for the SUL and non-SUL carriers of the serving cell, in response to that a time alignment timer associated with a TAG corresponding to a serving cell does not run, not initiate, by the MAC entity, any UL transmission other than random access pilot transmission in the serving cell or on a SUL carrier and non-SUL carrier, associated with the TAG, of the serving cell.

In some embodiments, the device can further include:

a fifth processing module, configured to, after the setting module sets the TAG IDs for the SUL and non-SUL carriers of the serving cell, in response to that the time alignment timer associated with the pTAG does not run, by the MAC entity, initiate random access pilot transmission in the SpCell and not initiate any UL transmission in another serving cell.

In some embodiments, the device can further include:

a sixth processing module, configured to, after the setting module sets the TAG IDs for the SUL and non-SUL carriers of the serving cell, in another serving cell (SCell) other than the SpCell or on a UL carrier of the SCell or on a UL carrier, belonging to an sTAG, of the SpCell, in response to that UL transmission exceeds a maximum UL transmission time difference or exceeds a maximum UL transmission time difference between two TAGs capable of being processed by the UE, by the MAC entity, stop the UL transmission and determine that a time alignment timer associated with the SCell or the UL carrier of the SCell or the UL carrier, belonging to the sTAG, of the SpCell expires, the UL carrier including a SUL or non-SUL carrier.

According to another aspect of the embodiments of the present disclosure, a TAG ID configuration device is provided, which can be applied to a base station and include:

a generation module, configured to generate configuration information, the configuration information including a SUL carrier configured for a serving cell of UE and TAG IDs configured for the SUL carrier and a non-SUL carrier of the serving cell of the UE; and a first sending module, configured to send the configuration information generated by the generation module to the UE.

In some embodiments, the device can further include:

a second sending module, configured to, after the first sending module sends the configuration information to the UE, send a TAC to the UE, the TAC including a TAC for a TAG of the SUL or non-SUL carrier or a TAC for a TAG of the SUL or non-SUL carrier from an RAR of the serving cell.

According to another aspect of the embodiments of the present disclosure, a base station is provided, which may include:

a processor; and a memory configured to store an instruction executable for the processor, wherein the processor can be configured to:

generate configuration information, the configuration information including a SUL carrier configured for a serving cell of UE and TAG IDs configured for the SUL carrier and a non-SUL carriers of the serving cell of the UE; and send the configuration information to the UE.

According to another aspect of the embodiments of the present disclosure, a computer-readable storage medium is provided, in which a computer instruction can be stored, the instruction being executed by a processor to implement the operations of the TAG ID configuration method.

Various embodiments of the present disclosure can have one or more of the following advantages.

The configuration information can be received, and the TAG IDs can be set for the SUL and non-SUL carriers of the serving cell of the UE according to the configuration information respectively, such that the SUL and non-SUL carriers of the serving cell can be set in corresponding TAGs.

The configuration information including the TAG IDs configured for the SUL and non-SUL carriers of the serving cell of the UE respectively can be generated and sent to the UE to enable the UE to set the TAG IDs for the SUL and non-SUL carriers of the serving cell of the UE according to the received configuration information respectively, so that the SUL and non-SUL carriers of the serving cell can be set in the corresponding TAGs.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HIVID) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for setting a Time Advance Group (TAG) Identifier (ID), applied to User Equipment (UE), the method comprising:
   receiving configuration information sent by a base station, the configuration information comprising a Supplement UpLink (SUL) carrier configured for a serving cell of the UE;
   setting, according to the configuration information, TAG IDs for the SUL carrier and a non-SUL carrier of the serving cell of the UE respectively, and
   in response to that a time alignment timer associated with a TAG corresponding to a serving cell does not run, not initiating, by a Media Access Control (MAC) entity, any UL transmission other than random access pilot transmission in the serving cell or on the SUL carrier and the non-SUL carrier, associated with the TAG, of the serving cell.

2. The method of claim 1, wherein
   the configuration information further comprises the TAG IDs configured for the SUL carrier and the non-SUL carrier of the serving cell of the UE respectively, and
   wherein setting, according to the configuration information, the TAG IDs for the SUL carrier and the non-SUL carrier of the serving cell of the UE respectively comprises:
   directly setting, according to the configuration information, the corresponding TAG IDs for the SUL and non-SUL carriers of the serving cell of the UE;
   or,
   wherein setting, according to the configuration information, the TAG IDs for the SUL and non-SUL carriers of the serving cell of the UE respectively comprises:
   setting, according to the configuration information, the TAG IDs for the SUL and non-SUL carrier of the serving cell of the UE in a system stipulated manner respectively.

3. The method of claim 1, further comprising:
   in response to that a Media Access Control (MAC) entity receives a Timing Advance Command (TAC) for a TAG, applying the TAC to the TAG, and starting or restarting a time alignment timer associated with the TAG.

4. The method of claim 3, further comprising:
in response to that the time alignment timer expires, if the time alignment timer is associated with a primary TAG (pTAG), by the MAC entity, clearing caches of Hybrid Automatic Repeat reQuests (HARQs) of all serving cells from the MAC entity, notifying a Radio Resource Control (RRC) layer to release Physical Uplink Control Channels (PUCCHs) and Semi-Persistent Scheduling (SPS) of all the serving cells from the MAC entity, clearing all configured Downlink (DL) and Uplink (UL) resource allocation from the MAC entity and determining that all time alignment timers expire; or
in response to that the time alignment timer expires, if the pTAG associated with the time alignment timer only comprises a SUL or non-SUL carrier where a Physical Uplink Shared Channel (PUSCH) of a Special Cell (SpCell) is located but does not comprise a SUL or non-SUL carrier where a Physical Uplink Control Channel (PUCCH) of the SpCell is located and the SpCell is configured in a manner that the PUSCH is dynamically scheduled on the SUL carrier and the non-SUL carrier, by the MAC entity, for the SpCell, executing an operation of clearing caches of Hybrid Automatic Repeat reQuests (HARQs) of carriers corresponding to the pTAG associated with the time alignment timer and notifying the RRC layer to release SPS on the carrier corresponding to the pTAG associated with the time alignment timer, and for a non-SpCell, executing an operation of clearing caches of HARQs of carriers corresponding to the pTAG associated with the time alignment timer and notifying the RRC layer to release a PUCCH and SPS; or
in response to that the time alignment timer expires, if the time alignment timer is associated with a secondary TAG (sTAG), by the MAC entity, for carriers, belonging to the associated sTAG, of all serving cells not configured with SUL carriers, executing an operation of clearing caches of Hybrid Automatic Repeat reQuests (HARQs) and notifying the RRC layer to release PUCCHs and SPS, and for a SUL or non-SUL carrier, belonging to the associated sTAG, of a serving cell configured with the SUL carrier, executing an operation of clearing caches of HARQs and notifying the RRC layer to release SPS and a PUCCH.

5. The method of claim 4, wherein
the pTAG is a TAG comprising a SUL or non-SUL carrier of an SpCell, and the sTAG is a TAG other than the pTAG; or
the pTAG is a TAG where a UL carrier supporting transmission of a PUCCH of an SpCell or a UL carrier supporting transmission of a PUCCH of an SpCell and supporting contention-based random access is located, and the sTAG is another TAG other than the pTAG, the UL carrier comprises a SUL or non-SUL carrier; or
the pTAG comprises a TAG where a UL carrier supporting transmission of a PUCCH of an SpCell or a UL carrier supporting transmission of a PUCCH of an SpCell and supporting contention-based random access is located, and a TAG where a UL carrier supporting transmission of a PUSCH of an SpCell is located, and the sTAG is another TAG other than the pTAG, the UL carrier comprises a SUL or non-SUL carrier; or
the pTAG comprises a TAG where a UL carrier supporting transmission of a PUCCH of an SpCell or a UL carrier supporting transmission of a PUCCH of an SpCell and supporting contention-based random access is located, or a TAG where a UL carrier supporting transmission of a PUSCH of an SpCell is located, and the sTAG comprises another TAG other than the pTAG, the UL carrier comprises a SUL or non-SUL carrier.

6. The method of claim 5, further comprising:
in response to that the time alignment timer associated with the pTAG does not run, by the MAC entity, initiating random access pilot transmission in the SpCell and not initiating any UL transmission in another serving cell.

7. The method of claim 5, further comprising:
in another Serving Cell (SCell)) other than the SpCell or on a UL carrier of the SCell or on a UL carrier, belonging to an sTAG, of the SpCell, in response to that UL transmission exceeds a maximum UL transmission time difference or exceeds a maximum UL transmission time difference between two TAGs capable of being processed by the UE, by the MAC entity, stopping the UL transmission and determining that a time alignment timer associated with the SCell or the UL carrier of the SCell or the UL carrier, belonging to the sTAG, of the SpCell expires, the UL carrier comprises a SUL or non-SUL carrier.

8. The method of claim 1, further comprising:
in response to that a Media Access Control (MAC) entity receives a Timing Advance Command (TAC) for a TAG of the SUL or non-SUL carrier from a Random Access Response (RAR) of a serving cell, if a random access pilot corresponding to the RAR is not selected by the MAC entity, applying the TAC to the TAG of the SUL or non-SUL carrier, and starting or restarting a time alignment timer associated with the corresponding TAG; or
in response to that a Media Access Control (MAC) entity receives a Timing Advance Command (TAC) for a TAG of the SUL or non-SUL carrier from a Random Access Response (RAR) of a serving cell, if a random access pilot corresponding to the RAR is selected by the MAC entity but a time alignment timer associated with the TAG does not run, applying the TAC to the TAG of the SUL or non-SUL carrier, and starting or restarting the time alignment timer associated with the corresponding TAG.

9. A communication system implementing the method of claim 1, comprising the UE and the base station, wherein the base station is configured to generate and send the configuration information including the TAG IDs configured for the SUL and non-SUL carriers of the serving cell of the UE respectively to the UE, to thereby enable the UE to set the TAG IDs for the SUL and non-SUL carriers of the serving cell of the UE according to the configuration information respectively, such that the SUL and non-SUL carriers of the serving cell are set in the corresponding TAGs.

10. User Equipment (UE), comprising:
a processor; and
memory storing instructions for execution by the processor,
wherein the processor is configured to:
receive configuration information sent by a base station, the configuration information comprising a Supplement UpLink (SUL) carrier configured for a serving cell of the UE;
set, according to the configuration information, TAG IDs for the SUL carrier and a non-SUL carrier of the serving cell of the UE respectively; and
in response to that a time alignment timer associated with a TAG corresponding to a serving cell does not run, not initiate, by a Media Access Control (MAC) entity, any UL transmission other than random access pilot transmission in the serving cell or on the SUL carrier and the non-SUL carrier, associated with the TAG, of the serving cell.

11. The UE of claim 10, wherein the configuration information further comprises the TAG IDs configured for the SUL and non-SUL carriers of the serving cell of the UE respectively, and the processor is further configured to:
directly set, according to the configuration information, the corresponding TAG IDs for the SUL and non-SUL carriers of the serving cell of the UE;
or
the processor is further configured to:
set, according to the configuration information, the TAG IDs for the SUL and non-SUL carriers of the serving cell of the UE in a system stipulated manner respectively.

12. The UE of claim 10, wherein the processor is further configured to:
after setting the TAG IDs for the SUL and non-SUL carriers of the serving cell, in response to that a Media Access Control (MAC) entity receives a Timing Advance Command (TAC) for a TAG, apply the TAC to the TAG and start or restart a time alignment timer associated with the TAG.

13. The UE of claim 12, wherein the processor is further configured to:
in response to that a time alignment timer started or restarted expires, if the time alignment timer is associated with a primary TAG (pTAG), by the MAC entity, clear Caches of Hybrid Automatic Repeat reQuests (HARQs) of all serving cells from the MAC entity, notify a Radio Resource Control (RRC) layer to release Physical Uplink Control Channels (PUCCHs) and Semi-Persistent Scheduling (SPS) of all the serving cells from the MAC entity, clear all configured Downlink (DL) and Uplink (UL) resource allocation from the MAC entity and determine that all time alignment timers expire; or
in response to that a time alignment timer started or restarted expires, if the pTAG associated with the time alignment timer only comprises a SUL or non-SUL carrier where a Physical Uplink Shared Channel (PUSCH) of a Special Cell (SpCell) is located but does not comprise a SUL or non-SUL carrier where a Physical Uplink Control Channel (PUCCH) is located and the SpCell is configured in a manner that the PUSCH is dynamically scheduled on the SUL carrier and the non-SUL carrier, by the MAC entity, for the SpCell, execute an operation of clearing caches of Hybrid Automatic Repeat reQuests (HARQs) of carriers corresponding to the pTAG associated with the time alignment timer and notify the RRC layer to release SPS on the carrier corresponding to the pTAG associated with the time alignment timer, and for a non-SpCel, execute an operation of clearing caches of HARQs of carriers corresponding to the pTAG associated with the time alignment timer and notify the RRC layer to release a PUCCH and SPS; or
in response to that a time alignment timer started or restarted expires, if the time alignment timer is associated with a secondary TAG (sTAG), by the MAC entity, for carriers, belonging to the associated sTAG, of all serving cells not configured with SUL carriers, execute an operation of clearing caches of HARQs and notify the RRC layer to release PUCCHs and SPS, and for a SUL or non-SUL carrier, belonging to the associated sTAG, of a serving cell configured with the SUL carrier, execute an operation of clearing caches of HARQs and notify the RRC layer to release SPS and a PUCCH.

14. The UE of claim 13, wherein
the pTAG is a TAG comprising a SUL or non-SUL carrier of an SpCell, and the sTAG is another TAG other than the pTAG; or
the pTAG is a TAG where a UL carrier supporting transmission of a PUCCH of an SpCell or a UL carrier supporting transmission of a PUCCH of an SpCell and supporting contention-based random access is located, and the sTAG is another TAG other than the pTAG, the UL carrier comprises a SUL or non-SUL carrier; or
the pTAG comprises a TAG where a UL carrier supporting transmission of a PUCCH of an SpCell or a UL carrier supporting transmission of a PUCCH of an SpCell and supporting contention-based random access is located and a TAG where a UL carrier supporting transmission of a PUSCH of an SpCell is located, and the sTAG is another TAG other than the pTAG, the UL carrier comprises a SUL or non-SUL carrier; or
the pTAG comprises a TAG where a UL carrier supporting transmission of a PUCCH of an SpCell or a UL carrier supporting transmission of a PUCCH of an SpCell and supporting contention-based random access is located or a TAG where a UL carrier supporting transmission of a PUSCH of an SpCell is located, and the sTAG is another TAG other than the pTAG, the UL carrier comprises a SUL or non-SUL carrier.

15. The UE of claim 14, wherein the processor is further configured to:
after setting the TAG IDs for the SUL and non-SUL carriers of the serving cell, in response to that the time alignment timer associated with the pTAG does not run, by the MAC entity, initiate random access pilot transmission in the SpCell and not initiate any UL transmission in another serving cell.

16. The UE of claim 14, wherein the processor is further configured to:
after setting the TAG IDs for the SUL and non-SUL carriers of the serving cell, in another serving cell (Secondary Cell (SCell)) other than the SpCell or on a UL carrier of the SCell or on a UL carrier, belonging to an sTAG, of the SpCell, in response to that UL transmission exceeds a maximum UL transmission time difference or exceeds a maximum UL transmission time difference between two TAGs capable of being processed by the UE, by the MAC entity, stop the UL transmission and determine that a time alignment timer associated with the SCell or the UL carrier of the SCell or the UL carrier, belonging to the sTAG, of the SpCell expires, the UL carrier comprises a SUL or non-SUL carrier.

17. The UE of claim 10, wherein the processor is further configured to:
after setting the TAG IDs for the SUL and non-SUL carriers of the serving cell, in response to that the MAC entity receives a Timing Advance Command (TAC) for a TAG of the SUL or non-SUL carrier from a Random Access Response (RAR) of the serving cell, if a random access pilot corresponding to the RAR is not selected by the MAC entity, apply the TAC to the TAG of the SUL or non-SUL carrier and start or restart a time alignment timer associated with the corresponding TAG; or after setting the TAG IDs for the SUL and non-SUL carriers of the serving cell, in response to that the MAC entity receives Timing Advance Command (TAC) for a TAG of the SUL or non-SUL carrier from the RAR of the serving cell, if the random access pilot corresponding to the RAR is selected by the MAC entity but the time alignment timer associated with the TAG does not run, apply the TAC to the TAG of the SUL or non-SUL carrier and start or restart the time alignment timer associated with the corresponding TAG.

18. A non-transitory computer-readable storage medium having computer instructions stored thereon, the computer instructions being executed by a processor to implement:

receiving configuration information sent by a base station, the configuration information comprising a Supplement UpLink (SUL) carrier configured for a serving cell of the UE;

setting, according to the configuration information, TAG IDs for the SUL carrier and a non-SUL carrier of the serving cell of the UE respectively; and in response to that a time alignment timer associated with a TAG corresponding to a serving cell does not run, not initiating, by a Media Access Control (MAC) entity, any UL transmission other than random access pilot transmission in the serving cell or on the SUL carrier and the non-SUL carrier, associated with the TAG, of the serving cell, wherein the configuration information further comprises the TAG IDs configured for the SUL and non-SUL carriers of the serving cell of the UE respectively, and the computer instructions are executed by the processor to:

directly set, according to the configuration information, the corresponding TAG IDs for the SUL and non-SUL carriers of the serving cell of the UE;

or the processor is further configured to:

set, according to the configuration information, the TAG IDs for the SUL and non-SUL carriers of the serving cell of the UE in a stipulated manner respectively.

* * * * *